United States Patent
Chen et al.

(10) Patent No.: US 10,057,861 B2
(45) Date of Patent: Aug. 21, 2018

(54) TECHNIQUES FOR REPORTING POWER HEADROOM IN MULTIPLE CONNECTIVITY WIRELESS COMMUNICATIONS

(71) Applicant: QUALCOMM Incorporated, San Diego, CA (US)

(72) Inventors: Wanshi Chen, San Diego, CA (US); Peter Gaal, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 14/673,487

(22) Filed: Mar. 30, 2015

(65) Prior Publication Data

US 2015/0350944 A1 Dec. 3, 2015

Related U.S. Application Data

(60) Provisional application No. 62/007,266, filed on Jun. 3, 2014.

(51) Int. Cl.
*H04W 52/36* (2009.01)
*H04W 24/10* (2009.01)
*H04L 12/26* (2006.01)

(52) U.S. Cl.
CPC ......... *H04W 52/365* (2013.01); *H04L 43/065* (2013.01); *H04L 43/08* (2013.01); *H04W 24/10* (2013.01)

(58) Field of Classification Search
None
See application file for complete search history.

(56) References Cited

U.S. PATENT DOCUMENTS

2012/0224552 A1* 9/2012 Feuersanger ......... H04L 5/0007
370/329
2013/0051259 A1* 2/2013 Kim ....................... H04L 5/001
370/252

(Continued)

FOREIGN PATENT DOCUMENTS

| EP | 2 861 025 A1 | 4/2015 |
|---|---|---|
| WO | WO-2015/032023 A1 | 3/2015 |
| WO | WO-2015/116866 A1 | 8/2015 |
| WO | WO-2015/141747 A1 | 9/2015 |
| WO | WO-2015/171038 A1 | 11/2015 |

OTHER PUBLICATIONS

International Preliminary Report on Patentability—PCT/US2015/028288 The International Bureau of WIPO—Geneva, Switzerland, May 4, 2016. 8 Total Pages.

(Continued)

*Primary Examiner* — Donald Mills
(74) *Attorney, Agent, or Firm* — Dalei Dong; Arent Fox

(57) ABSTRACT

Certain aspects of the present disclosure relate to reporting power headroom in wireless communications. A device can establish a first connection served by at least a first cell, and establish a second connection served by at least a second cell in multiple connectivity/carrier aggregation. The device can then determine to report a first power headroom in a first uplink subframe of the first cell in the first cell. The device can also determine a reporting configuration for possibly reporting a second power headroom based on a second subframe of the second cell as a companion report with the first power headroom when a type of the second subframe of the second cell is not an uplink subframe.

28 Claims, 11 Drawing Sheets

(56) References Cited

U.S. PATENT DOCUMENTS

| | | | |
|---|---|---|---|
| 2013/0100916 A1* | 4/2013 | Park | H04W 24/10 370/329 |
| 2013/0121203 A1* | 5/2013 | Jung | H04W 52/30 370/252 |
| 2013/0128859 A1 | 5/2013 | Takaoka et al. | |
| 2014/0056278 A1 | 2/2014 | Mariner et al. | |
| 2015/0098424 A1* | 4/2015 | Li | H04W 72/04 370/329 |
| 2015/0215877 A1* | 7/2015 | Ahn | H04W 72/0413 455/522 |
| 2015/0264655 A1* | 9/2015 | Lee | H04W 24/10 370/329 |
| 2016/0029239 A1* | 1/2016 | Sadeghi | H04W 24/10 370/252 |
| 2016/0112961 A1* | 4/2016 | Zhang | H04W 52/34 455/522 |
| 2016/0142985 A1* | 5/2016 | Lee | H04W 52/34 370/329 |
| 2016/0198421 A1* | 7/2016 | Yi | H04W 52/365 370/329 |

OTHER PUBLICATIONS

Interdigital: "Remaining issues on power headroom reporting for Dual Connectivity", 3GPP Draft; R1-143236, 3rd Generation Partnership Project (3GPP), Mobile Competence Centre ; 650, Route Des Lucioles ; F-06921 Sophia-Antipolis Cedex; France vol. RAN WG1, no. Dresden, Germany; Aug. 18, 2014-Aug. 22, 2014 Aug. 10, 2014 (Aug. 10, 2014), XP050815628, Retrieved from the Internet: URL: http://www.3gpp.org/ftp/tsg ran/WG1_RL1/TSGR1_78/Docs/—[retrieved on Aug. 10, 2014] paragraph [02.3].
International Search Report and Written Opinion—PCT/US2015/028288—ISA/EPO—dated Jul. 2, 2015. (14 total pages).
Qualcomm Incorporated: "Power headroom report for dual connectivity", 3GPP Draft; R1-142951 Power Headroom Report for Dual Connectivity, 3rd Generation Partnership Project (3GPP), Mobile Competence Centre ; 650, Route Des Lucioles ; F-06921 Sophia-Antipolis Cedex; Fran vol. RAN WG1, no. Dresden, Germany; Aug. 18, 2014-Aug. 22, 2014 Aug. 10, 2014 (Aug. 10, 2014), XP050815346, Retrieved from the Internet: URL: http://www.3gpp.org/ftp/tsg_ran/WG1_RL1/TSGR1_78/Docs/—[retrieved on Aug. 10, 2014] paragraph [0002].
Samsung: "Power headroom report for dual connectivity", 3GPP Draft; R2-141478, 3rd Generation Partnership Project (3GPP), Mobile Competence Centre ; 650, Route Des Lucioles ; F-06921 Sophia Antipolis Cedex; France vol. RAN WG2, no. Valencia, Spain; Mar. 31, 2014-Apr. 4, 2014 Mar. 22, 2014 (Mar. 22, 2014), XP050792649, Retrieved from the Internet: URL: http://www.3gpp.org/ftp/Meetings_3GPP_SYNC/RAN2/Docs/ [retrieved on Mar. 22, 2014] Timing misaligment in PHR?; p. 5-p. 6; figure 5.

* cited by examiner

US 10,057,861 B2

TECHNIQUES FOR REPORTING POWER HEADROOM IN MULTIPLE CONNECTIVITY WIRELESS COMMUNICATIONS

CLAIM OF PRIORITY UNDER 35 U.S.C. § 119

The present application for patent claims priority to Provisional Application No. 62/007,266 entitled "TECHNIQUES FOR REPORTING POWER HEADROOM IN MULTIPLE CONNECTIVITY WIRELESS COMMUNICATIONS" filed Jun. 3, 2014, which is assigned to the assignee hereof and hereby expressly incorporated in its entirety by reference herein.

FIELD OF THE DISCLOSURE

The present disclosure, for example, relates to wireless communication systems, and more particularly to techniques for reporting power headroom in multiple connectivity wireless communications.

BACKGROUND OF THE DISCLOSURE

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations (e.g., eNodeBs) that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

In multiple connectivity wireless communications, the UE can be configured to communicate with multiple cells or cell groups configured by multiple base stations using multiple links. In addition, in an example, each of the links may be configured with multiple component carriers (e.g., carrier aggregation over one or more of the multiple links with the corresponding cell group). In this configuration, the multiple cells or cell groups may each utilize different frame structures (e.g., frequency division duplexing (FDD), time division duplexing (TDD), etc.), different subframe configurations (e.g., in TDD), technologies allowing for dynamic subframe configurations, asynchronous timing, etc., in communicating with the UE.

UEs can report power headroom to a cell in one or more subframes. Where power headroom reporting is to occur for the multiple cells or cell groups, it is possible that subframes over which the UE is configured to provide power headroom reports (in an uplink subframe) for one cell or cell group may be a downlink subframe or other non-uplink subframe (e.g., special subframe) for one of the other cells or cell groups. The reporting of the power headroom in such subframes may be undefined. Moreover, it is possible that actual power headroom can be reported for one cell group, but only reporting of virtual power headroom is possible for another cell group. Thus, techniques for reporting power headroom in multiple connectivity wireless communication are needed.

SUMMARY OF THE DISCLOSURE

Aspects of the present disclosure relate generally to wireless communications, and more particularly, to techniques for reporting power headroom in multiple connectivity wireless communications. For example, techniques for reporting power headroom when communicating with multiple cells configured by multiple base stations are described herein.

In accordance with an aspect, a wireless device (e.g., user equipment (UE)) may communicate with multiple cells or cell groups (e.g., PCell or one or more SCells) configured by one or more base stations (e.g., a master eNodeB (MeNodeB or MeNB) and/or at least one secondary eNodeB (SeNodeB or SeNB)) in a wireless network. There may be one or more cells in the PCell, referred to as a master cell group (MCG) (or primary cell group (PCG)), and/or one or more cells in the SCell, referred to as a secondary cell group (SCG). In an example, the MCG may configure a first connection (e.g., over one or more carriers) for the wireless device, and the SCG may configure a second connection for the wireless device. Each connection may utilize different frame structures, different subframe configurations, asynchronous timings, etc. Accordingly, the wireless device may be configured to determine a reporting configuration for reporting power headroom for the MCG and/or SCG to resolve such potential differences between the cell groups.

For example, where the wireless device is configured to report power headroom in an uplink subframe for the MCG, the corresponding subframe (e.g., where MCG and SCG are synchronous such that the gating interval of the MCG is aligned with the gating interval of the SCG) may be a non-uplink subframe (e.g., downlink subframe or special subframe) for the SCG. In this case, for example, the wireless device may be configured by a reporting configuration to at least one of report the power headroom for the SCG using a virtual power headroom report, omit reporting the power headroom for the SCG, or selectively report the power headroom for the SCG, etc. In some examples, the wireless device may be configured to omit or perform power headroom reporting for the SCG in all subframes configured for MCG power headroom reporting. In other examples, the wireless device may be configured to omit or perform power headroom reporting for the SCG in a subframe configured for MCG power headroom reporting based on additional parameters, such as a subframe type.

According to an example, a method for reporting power headroom using multiple connectivity in a wireless network is provided. The method includes establishing a first connection served by at least a first cell, establishing a second connection served by at least a second cell, determining to report a first power headroom in a first uplink subframe of the first cell in the first cell, and determining a reporting configuration for a second power headroom based on a second subframe of the second cell when a type of the second subframe of the second cell is not an uplink subframe. The method also may include wherein the first connection and the second connection are synchronous, and the second subframe occurs at a same time as the first uplink subframe for determining to report the first power headroom. The method may further include wherein the type of the second subframe is one of a downlink subframe or a special subframe. The method may also further include determining the type of the second subframe based at least in part on a subframe configuration signaled by at least one of the first cell or the second cell. The method may include wherein determining the reporting configuration for the second power headroom comprises determining to report the second power headroom as a virtual power headroom based at least in part on the type of the second subframe as not an uplink subframe. The method may include wherein determining the reporting configuration for the second power headroom comprises determining to omit reporting of the second power headroom for the second cell.

The method may also include determining the type of the second subframe based at least in part on a semi-static subframe configuration or a dynamic subframe configuration. The method may include wherein determining the reporting configuration for the second power headroom comprises determining to report the second power headroom as a virtual power headroom when the second subframe is indicated as a non-uplink subframe according to the semi-static subframe configuration or the dynamic subframe configuration. The method may also include wherein determining to report the second power headroom is based at least in part on determining that the second subframe is indicated as an uplink subframe according to a subframe configuration signaled in system information from the second cell. Further, the method may include determining the reporting configuration for the second power headroom is based at least in part on determining the type of the second subframe of the second cell occurring before and overlapping the first uplink subframe, wherein the first cell and the second cell utilize asynchronous timing. The method may also include receiving a configuration from the first cell indicating one or more parameters for the reporting configuration for the second power headroom based on the first power headroom, wherein determining the reporting configuration is based at least in part on the configuration. Furthermore, the method may include reporting the first power headroom for the first cell, and indicating, in reporting the first power headroom, whether the second power headroom is included in the reporting the first power headroom. The method may also include reporting the first power headroom for the first cell and the second power headroom for the second cell, and indicating whether at least the second power headroom is a virtual power headroom or an actual power headroom.

The method may also include reporting the first power headroom for the first cell and the second power headroom for the second cell, determining whether a power headroom reporting condition is achieved for the second cell based on reporting the second power headroom, and indicating the reporting the second power headroom as based on the power headroom reporting condition based at least in part on determining the power headroom reporting condition is achieved for the second cell. Moreover, the method may include wherein indicating the reporting of the second power headroom as based on the power headroom reporting condition is further based at least in part on determining whether the second power headroom reported is an actual power headroom. The method may also include wherein the power headroom reporting condition for the second cell is at least based a path loss change, or a periodic configuration. The method may additionally include wherein the first connection and the second connection belong to two different cell groups, and one of the first connection and the second connection is of a primary cell group.

In another example, an apparatus for reporting power headroom using multiple connectivity in a wireless network is provided. The apparatus may include a communicating component for establishing a first connection served by at least a first cell and establishing a second connection served by at least a second cell, and a power headroom reporting component for determining to report a first power headroom in a first uplink subframe of the first cell in the first cell and determining a reporting configuration for a second power headroom based on a second subframe of the second cell when a type of the second subframe of the second cell is not an uplink subframe. The apparatus may also include wherein the first connection and the second connection are synchronous, and the second subframe occurs at a same time as the first uplink subframe for determining to report the first power headroom. The apparatus may further include wherein the type of the second subframe is one of a downlink subframe or a special subframe. Further, the apparatus may include a subframe type determining component configured to determine the type of the second subframe based at least in part on a subframe configuration signaled by at least one of the first cell or the second cell. The apparatus may also include wherein the power headroom reporting component is configured to determine the reporting configuration for the second power headroom as a virtual power headroom based at least in part on the type of the second subframe as not an uplink subframe. The apparatus may include wherein the power headroom reporting component is configured to determine the reporting configuration for the second power headroom to omit reporting of the second power headroom for the second cell.

The apparatus may also include a subframe type determining component configured to determine the type of the second subframe based at least in part on a semi-static subframe configuration or a dynamic subframe configuration. The apparatus may include wherein the power headroom reporting component is configured to determine the reporting configuration for the second power headroom as a virtual power headroom when the second subframe is indicated as a non-uplink subframe according to the semi-static subframe configuration or the dynamic subframe configuration. The apparatus may also include wherein the power headroom reporting component is configured to determine to report the second power headroom based at least in part on determining that the second subframe is indicated as an uplink subframe according to a subframe configuration signaled in system information from the second cell.

In another example, an apparatus for reporting power headroom using multiple connectivity in a wireless network is provided. The apparatus includes means for establishing a first connection served by at least a first cell, means for establishing a second connection served by at least a second cell, means for determining to report a first power headroom in a first uplink subframe of the first cell in the first cell, and means for determining a reporting configuration for a second power headroom based on a second subframe of the second cell when a type of the second subframe of the second cell is not an uplink subframe. The apparatus may also include wherein the first connection and the second connection are synchronous, and the second subframe occurs at a same time as the first uplink subframe for determining to report the first power headroom.

In yet another example, a computer-readable storage medium comprising computer-executable code for reporting power headroom using multiple connectivity in a wireless network is provided. The code comprises code for causing at least one computer to establish a first connection served by at least a first cell, code for causing the at least one computer to establish a second connection served by at least a second cell, code for causing the at least one computer to determine to report a first power headroom in a first uplink subframe of the first cell in the first cell, and code for causing the at least one computer to determine a reporting configuration for a second power headroom based on a second subframe of the second cell when a type of the second subframe of the second cell is not an uplink subframe. The computer-readable storage medium can also include wherein the first connection and the second connection are synchronous, and the second subframe occurs at a same time as the first uplink subframe for determining to report the first power headroom.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 1:
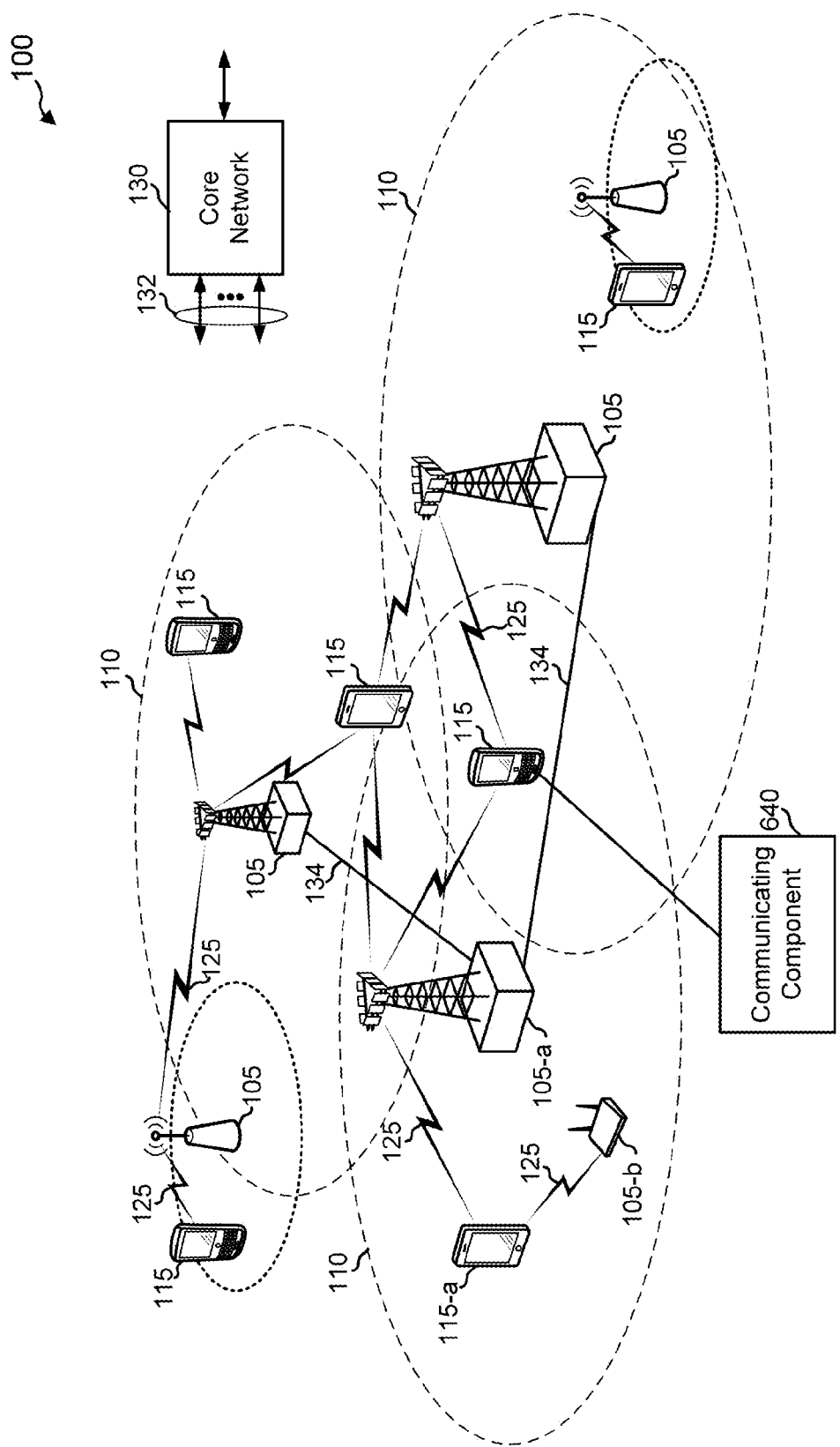
FIG. 1 is a block diagram conceptually illustrating an example of a wireless communications system, in accordance with an aspect of the present disclosure.

The detailed description set forth below, in connection with the appended drawings, is intended as a description of various configurations and is not intended to represent the only configurations in which the concepts described herein may be practiced. The detailed description includes details for the purpose of providing a thorough understanding of the various concepts. However, it will be apparent to those skilled in the art that these concepts may be practiced without these details. In some instances, well-known structures and components are shown in block diagram form in order to avoid obscuring such concepts.

Various techniques including methods, apparatuses, devices, and systems are described for reporting power headroom for using multiple connections in a carrier aggregation and/or multiple connectivity communication mode. In some aspects, a wireless device (e.g., user equipment (UE)) can communicate with the multiple cells configured by one or more network entities using carrier aggregation and/or multiple connectivity communication modes, which may include receiving granted resources from each of the multiple cells, over which the wireless device can communicate in accessing a wireless network. In some aspects, a wireless device may receive first configuration information to communicate with a first primary cell (e.g., a master cell group (MCG)/primary cell group (PCG) primary cell or PCell). The wireless device may also receive second configuration information to communicate with a second primary cell (e.g., a secondary cell group (SCG) primary cell or $PCell_{SCG}$) of the second network entity. In the case of multiple connectivity wireless communication, the PCells may be provided by different eNodeBs (e.g., a master eNodeB or MeNodeB that provides the PCell, and a secondary eNodeB or SeNodeB that provides the $PCell_{SCG}$). In either case, for each of the first primary cell and the second primary cell (or respective cell groups), the wireless device may determine whether to transmit power headroom reports (PHR) for a first cell or cell group, and may determine to transmit a corresponding PHR for a second cell or cell group in light of providing a PHR for the first cell or cell group. This determination may be based on additional considerations described herein.

A PHR, as referred to herein, can include an actual PHR that indicates an amount of transmission power left for a UE to use in addition to power used for a current transmission in a cell or cell group (e.g., based on a maximum transmit power defined for the UE and/or a nominal power), a virtual PHR that indicates an amount of transmission power left for a UE to use if it were to transmit in the cell or cell group (though an actual transmission in the cell or cell group does not occur), etc. The PHR can be a media access control (MAC) control element (CE) in LTE. In either case, a cell or cell group can use the PHR to determine an uplink bandwidth allocation for the wireless device in a subframe.

In an aspect, the MCG and SCG (or related eNodeBs) may configure the wireless device for communication over related carriers using different frame structures, different subframe configurations, different communication timings or offsets, and/or the like. Thus, when the wireless device is configured to report power headroom for the MCG, the timing or the uplink subframe of reporting may correspond to a non-uplink subframe (e.g., a downlink subframe or a special subframe) at the SCG. The wireless device may accordingly report or omit the power headroom report for the SCG along with the MCG in such cases. Thus, the device can determine a reporting configuration for the power headroom for the SCG.

In one example, the wireless device may be configured to report the power headroom for the SCG (and/or other cell groups) along with the power headroom report of the MCG. In another example, the wireless device may be configured to omit reporting the power headroom for the SCG when reporting the power headroom for the MCG. In yet another example, the wireless device may be configured to report the power headroom for the SCG with the power headroom for the MCG based at least in part on a subframe type related to SCG communications at the time of (or preceding) reporting or determining to report power headroom for the MCG, where the subframe type can be indicated in system information and/or in a dynamic subframe configuration, etc. Also, for example, the wireless device may be configured to report an actual or virtual PHR based on the subframe type for SCG (e.g., report virtual PHR where the subframe is configured as downlink, special, or otherwise not uplink). Moreover, though described mostly in terms of determining whether to report power headroom for SCG when reporting power headroom for MCG, it is to be appreciated that the functionality described herein can apply to determining whether to report power headroom for MCG when reporting power headroom for SCG.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of UMTS. 3GPP LTE and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

FIG. 1 is a block diagram conceptually illustrating an example of a wireless communications system 100, in accordance with an aspect of the present disclosure. The wireless communications system 100 includes base stations (or cells) 105, user equipment (UEs) 115, and a core network 130. One or more of the UEs 115 may include a communicating component 640 for generating PHRs for each of a plurality of component carriers, as described further herein, which may include determining whether and/or how to generate PHRs where timing, subframe configuration, etc. between the component carriers differ. The base stations 105 may communicate with the UEs 115 under the control of a base station controller (not shown), which may be part of the core network 130 or the base stations 105 in various embodiments. The base stations 105 may communicate control information and/or user data with the core network 130 through first backhaul links 132. In embodiments, the base stations 105 may communicate, either directly or indirectly, with each other over second backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc. The wireless communications system 100 may also support operation on multiple flows at the same time. In some aspects, the multiple flows may correspond to multiple wireless wide area networks (WWANs) or cellular flows. In other aspects, the multiple flows may correspond to a combination of WWANs or cellular flows and wireless local area networks (WLANs) or Wi-Fi flows.

The base stations 105 may wirelessly communicate with the UEs 115 via one or more base station antennas. Each of the base stations 105 sites may provide communication coverage for a respective geographic coverage area 110. In some embodiments, base stations 105 may be referred to as a base transceiver station, a radio base station, an access point, a radio transceiver, a basic service set (BSS), an extended service set (ESS), a NodeB, eNodeB, Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro, micro, and/or pico base stations). There may be overlapping coverage areas for different technologies.

In implementations, the wireless communications system 100 is an LTE/LTE-A network communication system. In LTE/LTE-A network communication systems, the terms evolved Node B (eNodeB) may be used to describe the base stations 105. The wireless communications system 100 may be a Heterogeneous LTE/LTE-A network in which different types of eNodeBs provide coverage for various geographical regions. For example, each eNodeB 105 may provide communication coverage for a macro cell, a pico cell, a femto cell, and/or other types of cell. A macro cell may cover a relatively large geographic area (e.g., several kilometers in radius) and may allow unrestricted access by UEs 115 with service subscriptions with the network provider. A pico cell may cover a relatively smaller geographic area (e.g., buildings) and may allow unrestricted access by UEs 115 with service subscriptions with the network provider. A femto cell may also cover a relatively small geographic area (e.g., a home) and, in addition to unrestricted access, may also provide restricted access by UEs 115 having an association with the femto cell (e.g., UEs 115 in a closed subscriber group (CSG), UEs 115 for users in the home, and the like). An eNodeB 105 for a macro cell may be referred to as a macro eNodeB. An eNodeB 105 for a pico cell may be referred to as a pico eNodeB. And, an eNodeB 105 for a femto cell may be referred to as a femto eNodeB or a home eNodeB. An eNodeB 105 may support one or multiple (e.g., two, three, four, and the like) cells. The wireless communications system 100 may support use of LTE and WLAN or Wi-Fi by one or more of the UEs 115.

The core network 130 may communicate with the eNodeBs 105 or other base stations 105 via first backhaul links 132 (e.g., S1 interface, etc.). The eNodeBs 105 may also communicate with one another, e.g., directly or indirectly via second backhaul links 134 (e.g., X2 interface, etc.) and/or via the first backhaul links 132 (e.g., through core network 130). The wireless communications system 100 may support synchronous or asynchronous operation. For synchronous operation, the eNodeBs 105 may have similar frame timing, and transmissions from different eNodeBs 105 may be approximately aligned in time. For asynchronous operation, the eNodeBs 105 may have different frame timing, and transmissions from different eNodeBs 105 may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with macro eNodeBs, pico eNodeBs, femto eNodeBs, relays, and the like.

The communication links 125 shown in the wireless communications system 100 may include uplink (UL) transmissions from a UE 115 to an eNodeB 105, and/or downlink (DL) transmissions, from an eNodeB 105 to a UE 115. The downlink transmissions may also be called forward link transmissions while the uplink transmissions may also be called reverse link transmissions.

In certain aspects of the wireless communications system 100, a UE 115 may be configured to support carrier aggregation (CA) or multiple connectivity wireless communication with two or more cells provided by one or more eNodeBs 105. The eNodeBs 105 that are used for CA/multiple connectivity may be collocated or may be connected through fast connections and/or non-collocated. In either case, coordinating the aggregation of component carriers (CCs) for wireless communications between the UE 115 and the eNodeBs 105 may be carried out more easily because information can be readily shared between the various cells being used to perform the carrier aggregation. When the eNodeBs 105 that are used for carrier aggregation are non-collocated (e.g., far apart or do not have a high-speed connection between them), then coordinating the aggregation of component carriers may involve additional aspects. For example, in carrier aggregation for dual connectivity (e.g., UE 115 connected to two non-collocated eNodeBs 105), the UE 115 may receive configuration information to communicate with a first eNodeB 105 (e.g., SeNodeB or SeNB) through a primary cell of the first eNodeB 105. The first eNodeB 105 may include a group of cells referred to as a secondary cell group or SCG, which includes one or more secondary cells and the primary cell or $PCell_{SCG}$ of the first eNodeB 105. The UE 115 may also receive configuration information to communicate with a second eNodeB 105 (e.g., MeNodeB or MeNB) through a second primary cell of the second eNodeB 105. The second eNodeB 105 may include a group of cells referred to as a master cell group or MCG, which includes one or more secondary cells and the primary cell or $PCell_{MCG}$ of the second eNodeB 105.

In certain aspects of the wireless communications system 100, carrier aggregation for dual connectivity may involve having a secondary eNodeB 105 (e.g., SeNodeB or SeNB) be configured to operate one of its cells as a $PCell_{SCG}$. The secondary eNodeB 105 may transmit, to a UE 115, configuration information through the $PCell_{SCG}$ for the UE 115 to communicate with the secondary eNodeB 105 while the UE 115 is in communication with a master eNodeB 105 (e.g., MeNodeB or MeNB). The master eNodeB 105 may transmit, to the same UE 115, configuration information via its PCell for that UE 115 to communication with the other eNodeB 105. The two eNodeBs 105 may be non-collocated.

In some examples, UE 115 may be configured with component carriers having different frame structures, different subframe configurations, asynchronous timings, etc. For example, each carrier can correspond to a cell in multiple connectivity wireless communications or the same cell in carrier aggregation. In an example, the $PCell_{MCG}$ (e.g., a related eNodeB 105 in the MCG) and $PCell_{SCG}$ (e.g., a related eNodeB 105 in the SCG) may configure a UE 115 according to different frame structures, different subframe configurations, asynchronous timings, etc. In one example, $PCell_{MCG}$ may configure the UE 115 to use FDD communications such that the UE 115 can communicate in the MCG over different frequency subbands for uplink and downlink communications. In this example, $PCell_{SCG}$ may configure the UE 115 to use TDD communications such that some subframes over a given frequency band are used for uplink communications while other subframes over the same frequency band are used for downlink communications. Thus, the $PCell_{MCG}$ can configure the UE 115 to report PHR in substantially any subframe, but the subframe may not relate to an uplink subframe with the $PCell_{SCG}$, and thus there can be some uncertainty as to whether and/or how to report PHR for the $PCell_{SCG}$. Similarly, for example, in evolved interference management for traffic adaptation (eIMTA), a cell group configured for TDD communications can dynamically modify the TDD uplink/downlink subframe configuration based on traffic needs, and thus it is possible, in the above example, that a subframe configured for transmitting PHR by $PCell_{MCG}$ is configured for downlink communications with $PCell_{SCG}$, and the configuration may be dynamically modifiable in a given frame.

In examples described herein, UE 115 can be configured for reporting power headroom to the SeNB (or related SCG) based on reporting power headroom for the MeNB (or related MCG) and/or vice versa. For example, UE 115 may communicate a PHR for the SCG along with a PHR for the MCG based on a type of a subframe scheduled with the SCG at the time for transmitting the PHR for the MCG. For example, UE 115 may report or omit the PHR for the SCG based on a type of the subframe as not being an uplink subframe (e.g., a downlink or special subframe), which may be determined based on system information from the SCG, a dynamic or semi-static subframe configuration received from the SCG (e.g., in eIMTA, etc.), and/or the like. Moreover, for example, UE 115 may report the PHR for the SCG as a virtual PHR based on some reference other than a current uplink transmission (e.g., a previous uplink transmission) where the type of the subframe is not an uplink subframe, as opposed to an actual PHR that is generated and transmitted in reference to an uplink transmission (e.g., on PUCCH, PUSCH, etc.), since there is no uplink transmission to reference in the non-uplink subframe.

Furthermore, for example, where the MCG and SCG are not time aligned (e.g., not synchronized in time), PHR for the SCG can be considered for transmission at least as early as the MCG, which can include transmitting the PHR for the SCG at a second subframe on the SCG timeline that begins at the same time or before the first subframe on the MCG timeline over which the PHR is transmitted. Where the second subframe on the SCG timeline is not an uplink subframe, however, the UE 115 may be configured omit the PHR for the SCG or generate the PHR as a virtual PHR for the SCG.

Figure 2:
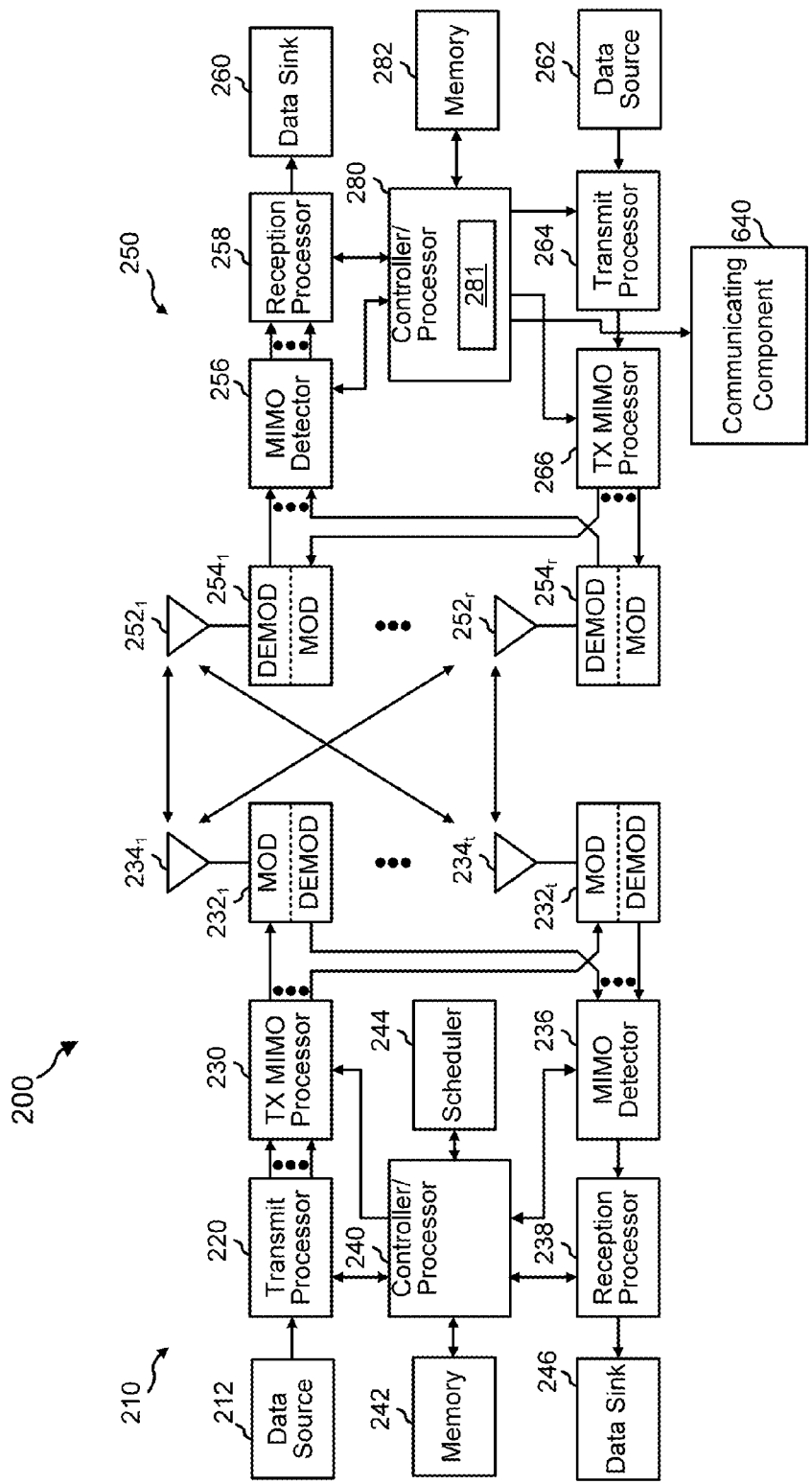
FIG. 2 is a block diagram conceptually illustrating examples of an eNodeB and a UE configured in accordance with an aspect of the present disclosure.

FIG. 2 is a block diagram conceptually illustrating examples of an eNodeB 210 and a UE 250 configured in accordance with an aspect of the present disclosure. For example, the base station/eNodeB 210 and the UE 250 of a system 200, as shown in FIG. 2, may be one of the base stations/eNodeBs and one of the UEs in FIG. 1, respectively. UE 250 may include a communicating component 640 for generating PHRs for each of a plurality of component carriers, as described further herein, which may include determining whether and/or how to generate PHRs where timing, subframe configuration, etc. between the component carriers differ. Communicating component 640 (and/or components thereof as described in FIG. 6) may be coupled to or otherwise implemented by controller/processor 280 and/or one or more other processors (e.g., reception processor 258, transmit processor 264, etc.). In some aspects, the eNodeB 210 may support multiple connectivity (e.g., dual connectivity), carrier aggregation, etc. The eNodeB 210 may be an MeNodeB or MeNB having one of the cells in its MCG configured as a $PCell_{MCG}$ or an SeNodeB or SeNB having one of its cells in its SCG configured as a $PCell_{SCG}$. In some aspects, the UE 250 may also support multiple connectivity carrier aggregation. The UE 250 may receive configuration information from the eNodeB 210 via the $PCell_{MCG}$ and/or the $PCell_{SCG}$. The base station 210 may be equipped with antennas $234_{1-t}$, and the UE 250 may be equipped with antennas $252_{1-r}$, wherein t and r are integers greater than or equal to one.

At the base station 210, a base station transmit processor 220 may receive data from a base station data source 212 and control information from a base station controller/processor 240. The control information may be carried on the PBCH, PCFICH, physical hybrid automatic repeat/request (HARQ) indicator channel (PHICH), PDCCH, etc. The data may be carried on the PDSCH, etc. The base station transmit processor 220 may process (e.g., encode and symbol map) the data and control information to obtain data symbols and control symbols, respectively. The base station transmit processor 220 may also generate reference symbols, e.g., for the PSS, SSS, and cell-specific reference signal (RS). A base station transmit (TX) multiple-input multiple-output (MIMO) processor 230 may perform spatial processing (e.g., precoding) on the data symbols, the control symbols, and/or the reference symbols, if applicable, and may provide output symbol streams to the base station modulators/demodulators (MODs/DEMODs) $232_{1-t}$. Each base station modulator/demodulator 232 may process a respective output symbol stream (e.g., for OFDM, etc.) to obtain an output sample stream. Each base station modulator/demodulator 232 may further process (e.g., convert to analog, amplify, filter, and upconvert) the output sample stream to obtain a downlink signal. Downlink signals from modulators/demodulators $232_{1-t}$ may be transmitted via the antennas $234_{1-t}$, respectively.

At the UE 250, the UE antennas $252_{1-r}$ may receive the downlink signals from the base station 210 and may provide received signals to the UE modulators/demodulators (MODs/DEMODs) $254_{1-r}$, respectively. Each UE modulator/demodulator 254 may condition (e.g., filter, amplify, downconvert, and digitize) a respective received signal to obtain input samples. Each UE modulator/demodulator 254 may further process the input samples (e.g., for OFDM, etc.) to obtain received symbols. A UE MIMO detector 256 may obtain received symbols from all the UE modulators/demodulators $254_{1-r}$, and perform MIMO detection on the received symbols if applicable, and provide detected symbols. A UE reception processor 258 may process (e.g., demodulate, deinterleave, and decode) the detected symbols, provide decoded data for the UE 250 to a UE data sink 260, and provide decoded control information to a UE controller/processor 280.

On the uplink, at the UE 250, a UE transmit processor 264 may receive and process data (e.g., for the PUSCH) from a UE data source 262 and control information (e.g., for the PUCCH) from the UE controller/processor 280. The UE transmit processor 264 may also generate reference symbols for a reference signal. The symbols from the UE transmit processor 264 may be precoded by a UE TX MIMO processor 266 if applicable, further processed by the UE modulator/demodulators $254_{1-r}$ (e.g., for SC-FDM, etc.), and transmitted to the base station 210. At the base station 210, the uplink signals from the UE 250 may be received by the base station antennas 234, processed by the base station modulators/demodulators 232, detected by a base station MIMO detector 236 if applicable, and further processed by a base station reception processor 238 to obtain decoded data and control information sent by the UE 250. The base station reception processor 238 may provide the decoded data to a base station data sink 246 and the decoded control information to the base station controller/processor 240.

The base station controller/processor 240 and the UE controller/processor 280 may direct the operation at the base station 210 and the UE 250, respectively. The UE controller/processor 280 and/or other processors and modules at the UE 250 may also perform or direct, e.g., the execution of the functional blocks illustrated in FIG. 6, and/or other processes for the techniques described herein (e.g., flowcharts illustrated in FIGS. 7, 8, and 10, communication timelines illustrated in FIG. 9, etc.). In some aspects, at least a portion of the execution of these functional blocks and/or processes may be performed by block 281 in the UE controller/processor 280. The base station memory 242 and the UE memory 282 may store data and program codes for the base station 210 and the UE 250, respectively. For example, the UE memory 282 may store configuration information for multiple connectivity wireless communication provided by the base station 210 and/or another base station. A scheduler 244 may be used to schedule UE 250 for data transmission on the downlink and/or uplink.

In one configuration, the UE 250 may include means for establishing a first connection served by at least a first cell configured by a first access point. The UE 250 may also include means for establishing a second connection served by at least a second cell configured by a second access point. The UE 250 may further include means for determining to report a first power headroom in a first subframe of the first cell for uplink communications in the first cell. The UE 250 can also include means for determining a reporting configuration for a second power headroom in a second subframe of the second cell when a first type of the first subframe of the first cell is different from a second type of the second subframe of the second cell. In one aspect, the aforementioned means may be the UE controller/processor 280, the UE memory 282, the UE reception processor 258, the UE MIMO detector 256, the UE modulators/demodulators 254, and the UE antennas 252 configured to perform the functions recited by the aforementioned means. In another aspect, the aforementioned means may be a module, component, or any apparatus configured to perform the functions recited by the aforementioned means. Examples of such modules, components, or apparatus may be described with respect to FIG. 6.

Figure 3:
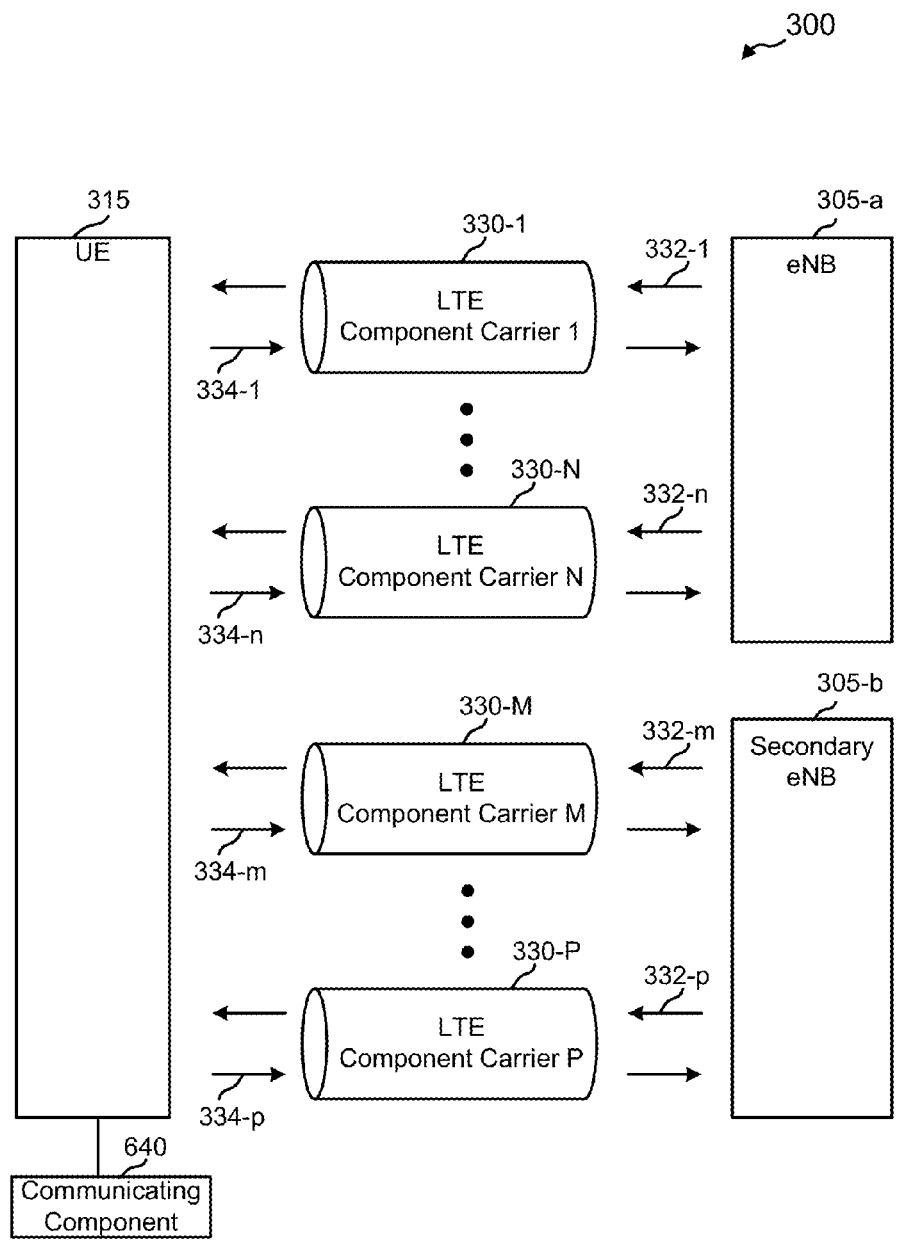
FIG. 3 is a block diagram conceptually illustrating an aggregation of radio access technologies at a UE, in accordance with an aspect of the present disclosure.

FIG. 3 is a block diagram conceptually illustrating an aggregation of carriers and/or connections at a UE, in accordance with an aspect of the present disclosure. The aggregation may occur in a system 300 including a multi-mode UE 315, which can communicate with an eNodeB 305-$a$ using one or more component carriers 1 through N ($CC_1$-$CC_N$), and/or with a secondary eNB 305-$b$ using one or more component carriers M through P ($CC_M$-$CC_P$). For example, the eNodeB 305-$a$ and/or secondary eNB 305-$b$ may include an AP, femto cell, pico cell, etc. UE 315 may include a communicating component 640 for generating PHRs for each of a plurality of component carriers, as described further herein, which may include determining whether and/or how to generate PHRs where timing, subframe configuration, etc. between the component carriers differ. UE 315 may be a multi-mode UE in this example that supports more than one radio access technology (RAT). For example, the UE 315 may support at least a WWAN radio access technology (e.g., LTE) and/or a WLAN radio access technology (e.g., Wi-Fi). A multi-mode UE may also support multiple connectivity carrier aggregation as described herein. The UE 315 may be an example of one of the UEs of FIG. 1, FIG. 2, FIG. 3, FIG. 4, FIG. 5, FIG. 6. The eNodeB 305-$a$ and/or secondary eNB 305-$b$ may be an example of one of the eNodeBs or base stations of FIG. 1, FIG. 2, FIG. 3, FIG. 4, FIG. 5, FIG. 6. While only one UE 305, one eNodeB 305-$a$, and one secondary eNB 305-$b$ are illustrated in FIG. 3, it will be appreciated that the system 300 can include any number of UEs 305, eNodeBs 305-$a$, and/or secondary eNBs 305-$b$. In one example, UE 315 can communicate with one eNB 305-$a$ over one or more LTE component carriers 330-1 to 330-N while communicating with another eNB 305-$b$ over another one or more component carriers 330-M to 330-P.

The eNodeB 305-$a$ can transmit information to the UE 315 over forward (downlink) channels 332-1 through 332-N on LTE component carriers $CC_1$ through $CC_N$ 330. In addition, the UE 315 can transmit information to the eNodeB 305-$a$ over reverse (uplink) channels 334-1 through 334-N on LTE component carriers $CC_1$ through $CC_N$. Similarly, the eNodeB 305-$b$ may transmit information to the UE 315 over forward (downlink) channels 332-$m$ through 332-$p$ on LTE component carriers $CC_M$ through $CC_P$ 330. In addition, the UE 315 may transmit information to the eNodeB 305-$b$ over reverse (uplink) channels 334-$m$ through 334-$p$ on LTE component carriers $CC_M$ through $CC_P$ 330.

In describing the various entities of FIG. 3, as well as other figures associated with some of the disclosed embodiments, for the purposes of explanation, the nomenclature associated with a 3GPP LTE or LTE-A wireless network is used. However, it is to be appreciated that the system 300 can operate in other networks such as, but not limited to, an OFDMA wireless network, a CDMA network, a 3GPP2 CDMA2000 network and the like.

In multi-carrier operations, the downlink control information (DCI) messages associated with different UEs 315 can be carried on multiple component carriers. For example, the DCI on a PDCCH can be included on the same component carrier that is configured to be used by a UE 315 for physical downlink shared channel (PDSCH) transmissions (i.e., same-carrier signaling). Alternatively, or additionally, the DCI may be carried on a component carrier different from the target component carrier used for PDSCH transmissions (i.e., cross-carrier signaling). In some implementations, a carrier indicator field (CIF), which may be semi-statically enabled, may be included in some or all DCI formats to facilitate the transmission of PDCCH control signaling from a carrier other than the target carrier for PDSCH transmissions (cross-carrier signaling).

In the present example, the UE 315 may receive data from one eNodeB 305-$a$. However, users on a cell edge may experience high inter-cell interference which may limit the data rates. Multiflow allows UEs to receive data from two eNodeBs 305-$a$ and 305-$b$ simultaneously. In some aspects, the two eNodeBs 305-$a$ may be non-collocated and may be configured to support multiple connectivity carrier aggregation. Multiflow works by sending and receiving data from the two eNodeBs 305-$a$/305-$b$ in two totally separate streams when a UE is in range of two cell towers in two adjacent cells at the same time (see FIG. 5 below). The UE talks to two eNodeB 305-$a$ and/or 305-$b$ simultaneously when the device is on the edge of either eNodeBs' reach. By scheduling two independent data streams to the mobile device from two different eNodeBs at the same time, multiflow exploits uneven loading in the wireless communication networks. This helps improve the cell edge user experience while increasing network capacity. In one example, throughput data speeds for users at a cell edge may double. In some aspects, multiflow may also refer to the ability of a UE to talk to a WWAN tower (e.g., cellular tower) and a WLAN tower (e.g., AP) simultaneously when the UE is within the reach of both towers. In such cases, the towers may be configured to support carrier aggregation through multiple connections when the towers are not collocated.

Figure 4:
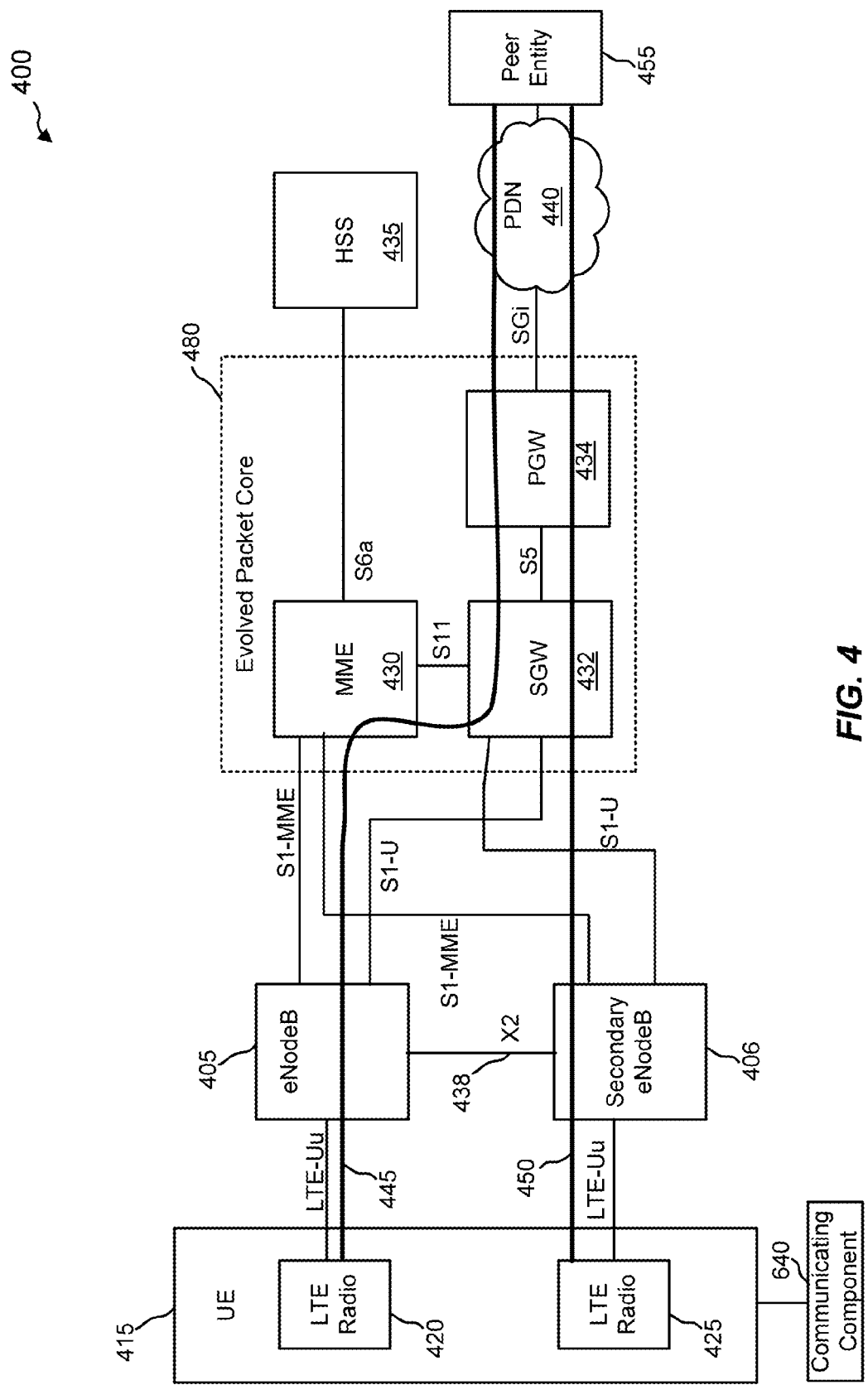
FIG. 4 is a block diagram conceptually illustrating an example of data paths between a UE and a PDN in accordance with an aspect of the present disclosure.

FIG. 4 is a block diagram conceptually illustrating an example of data paths 445 and 450 between a UE 415 and a PDN 440 (e.g., Internet or one or more components to access the Internet) in accordance with an aspect of the present disclosure. The data paths 445, 450 are shown within the context of a wireless communications system 400 for aggregating data from different radio access technologies. The system 200 of FIG. 2 may be an example of portions of the wireless communications system 400. The wireless communications system 400 may include a multi-mode UE 415, an eNodeB 405, secondary eNodeB 406 that can be coupled to the eNodeB 405 via a backhaul link 438 (e.g., based on a X2 interface), an evolved packet core (EPC) 480, a PDN 440, and a peer entity 455. The UE may include a communicating component 640 for generating PHRs for each of a plurality of component carriers, as described further herein, which may include determining whether and/or how to generate PHRs where timing, subframe configuration, etc. between the component carriers differ. The multi-mode UE 415 may be configured to support multiple connectivity (e.g., dual connectivity) carrier aggregation. The EPC 480 may include a mobility management entity (MME) 430, a serving gateway (SGW) 432, and a PDN gateway (PGW) 434. A home subscriber system (HSS) 435 may be communicatively coupled with the MME 430. The UE 415 may include an LTE radio 420 and an LTE radio 425. These elements may represent aspects of one or more of their counterparts described above with reference to the previous or subsequent Figures. For example, the UE 415 may be an example of UEs in FIG. 1, FIG. 2, FIG. 3, FIG. 5, FIG. 6, the eNodeB 405 may be an example of the eNodeBs/base stations of FIG. 1, FIG. 2, FIG. 3, FIG. 5, FIG. 6, the eNB 406 may be an example of the secondary eNB 305-b of FIG. 3, and/or the EPC 480 may be an example of the core network of FIG. 1. The eNodeBs 405 and/or 406 in FIG. 4 may be not be collocated or otherwise may not be in high-speed communication with each other. In addition, in an example, eNodeBs 405 and 406 may communicate with different EPCs 480.

Referring back to FIG. 4, the eNodeB 405 and/or 406 may be capable of providing the UE 415 with access to the PDN 440 using the aggregation of one or more LTE component carriers (e.g., with one or more eNodeBs). Accordingly, the UE 415 may involve carrier aggregation in dual connectivity, where one connection is to one network entity (eNodeB 405) and the other connection is to a different network entity (eNodeB 406). It is to be appreciated that UE 415 can communicate with additional eNodeBs 405 and/or 406 via additional communication paths 445, 450 that traverse the EPC 408 or not to access PDN 440 to provide multiple connectivity with multiple NodeBs, carrier aggregation with multiple cells of an eNodeB, etc. Using this access to the PDN 440, the UE 415 may communicate with the peer entity 455. The eNodeB 405 and/or 406 may provide access to the PDN 440 through the evolved packet core 480 (e.g., through data path 445), and the eNodeB 406 may provide direct access to the PDN 440 (e.g., through data path 450).

The MME 430 may be the control node that processes the signaling between the UE 415 and the EPC 480. The MME 430 may provide bearer and connection management. The MME 430 may, therefore, be responsible for idle mode UE tracking and paging, bearer activation and deactivation, and SGW selection for the UE 415. The MME 430 may communicate with the eNodeBs 405 and/or 406 over an S1-MME interface. The MME 430 may additionally authenticate the UE 415 and implement Non-Access Stratum (NAS) signaling with the UE 415.

The HSS 435 may, among other functions, store subscriber data, manage roaming restrictions, manage accessible access point names (APNs) for a subscriber, and associate subscribers with MMEs 430. The HSS 435 may communicate with the MME 430 over an S6a interface defined by the Evolved Packet System (EPS) architecture standardized by the 3GPP organization.

All user IP packets transmitted over LTE may be transferred through eNodeBs 405 and/or 406 to the SGW 432, which may be connected to the PDN gateway 434 over an S5 signaling interface and the MME 430 over an S11 signaling interface. The SGW 432 may reside in the user plane and act as a mobility anchor for inter-eNodeB handovers and handovers between different access technologies. The PDN gateway 434 may provide UE IP address allocation as well as other functions.

The PDN gateway 434 may provide connectivity to one or more external packet data networks, such as PDN 440, over an SGi signaling interface. The PDN 440 may include the Internet, an Intranet, an IP Multimedia Subsystem (IMS), a Packet-Switched (PS) Streaming Service (PSS), and/or other types of PDNs.

In the present example, user plane data between the UE 415 and the EPC 480 may traverse the same set of one or more EPS bearers, irrespective of whether the traffic flows over path 445 of the LTE link or path 450. Signaling or control plane data related to the set of one or more EPS bearers may be transmitted between the LTE radio 420 of the UE 415 and the MME 430 of the EPC 480, by way of the eNodeBs 405 and/or 406.

While aspects of FIG. 4 have been described with respect to LTE, similar aspects regarding aggregation and/or multiple connections may also be implemented with respect to UMTS or other similar system or network wireless communications radio technologies.

Figure 5:
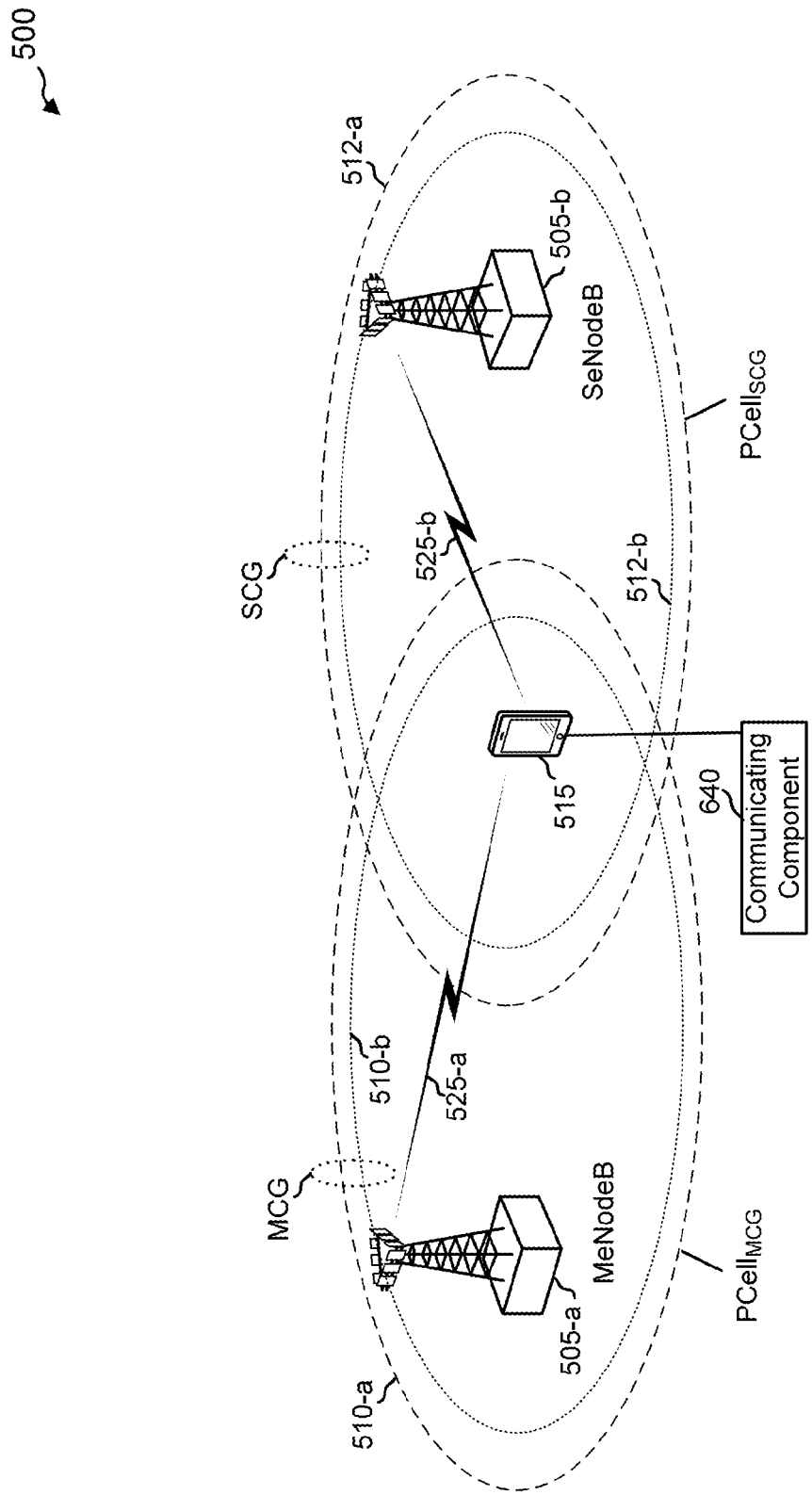
FIG. 5 is a diagram conceptually illustrating multiple connectivity carrier aggregation in accordance with an aspect of the present disclosure.

FIG. 5 is a diagram conceptually illustrating multiple connectivity carrier aggregation, in accordance with an aspect of the present disclosure. A wireless communications system 500 may include a master eNodeB 505-a (MeNodeB or MeNB) having a set or group of cells referred to as a master cell group or MCG (or PCG) that may be configured to serve the UE 515. The MCG may include one primary cell ($PCell_{MCG}$) 510-a and one or more secondary cells 510-b (only one is shown). The wireless communications system 500 may also include a secondary eNodeB 505-b (SeNodeB or SeNB) having a set or group of cells referred to as a secondary cell group or SCG that may be configured to serve the UE 515. The SCG may include one primary cell ($PCell_{SCG}$) 512-a and one or more secondary cells 512-b (only one is shown). Also shown is a UE 515 that supports carrier aggregation for multiple connectivity wireless communication (e.g., dual connectivity). The UE 515 may communicate with the MeNodeB 505-a, or a related $PCell_{MCG}$, via communication link 525-a and with the SeNodeB 505-b. or a related $PCell_{SCG}$, via communication link 525-b. In addition, the UE 515 may include a communicating component 640 for generating PHRs for each of a plurality of component carriers, as described further herein, which may include determining whether and/or how to generate PHRs where timing, subframe configuration, etc. between the component carriers differ.

In an example, the UE 515 may aggregate component carriers from the same eNodeB or may aggregate component carriers from collocated or non-collocated eNodeBs. In such an example, the various cells (e.g., different component carriers (CCs)) being used can be easily coordinated because they are either handled by the same eNodeB or by eNodeBs that can communicate control information. When the UE 515, as in the example of FIG. 5, performs carrier aggregation when in communication with two eNodeBs that are non-collocated, then the carrier aggregation operation may be different due to various network conditions. In this case, establishing a primary cell ($PCell_{SCG}$) in the secondary eNodeB 505-b may allow for appropriate configurations and controls to take place at the UE 515 even though the secondary eNodeB 505-b is non-collocated with the primary eNodeB 505-a.

In the example of FIG. 5, the carrier aggregation may involve certain functionalities by the $PCell_{MCG}$ of the MeNodeB 505-a. For example, the $PCell_{MCG}$ may handle certain functionalities such as physical uplink control channel (PUCCH), contention-based random access control channel (RACH), and semi-persistent scheduling to name a few. Carrier aggregation with dual or multiple connectivity to non-collocated eNodeBs may involve having to make some enhancements and/or modifications to the manner in which carrier aggregation is otherwise performed. Some of the enhancements and/or modifications may involve having the UE 515 connected to the MeNodeB 505-a and to the SeNodeB 505-b as described above. Other features may include, for example, having a timer adjustment group (TAG) comprise cells of one of the eNodeBs, having contention-based and contention-free random access (RA) allowed on the SeNodeB 505-b, separate discontinuous reception (DRX) procedures for the MeNodeB 505-a and to the SeNodeB 505-b, having the UE 515 send a buffer status report (BSR) to the eNodeB where the one or more bearers (e.g., eNodeB specific or split bearers) are served, as well as enabling one or more of power headroom report (PHR), power control, semi-persistent scheduling (SPS), and logical channel prioritization in connection with the $PCell_{SCG}$ in the secondary eNodeB 505-b. The enhancements and/or modifications described above, and well as others provided in the disclosure, are intended for purposes of illustration and not of limitation.

For carrier aggregation in dual connectivity, different functionalities may be divided between the MeNodeB 505-a and the SeNodeB 505-b. For example, different functionalities may be statically divided between the MeNodeB 505-a and the SeNodeB 505-b or dynamically divided between the MeNodeB 505-a and the SeNodeB 505-b based on one or more network parameters. In an example, the MeNodeB 505-a may perform upper layer (e.g., above the media access control (MAC) layer) functionality via a $PCell_{MCG}$, such as but not limited to functionality with respect to initial configuration, security, system information, and/or radio link failure (RLF). As described in the example of FIG. 5, the $PCell_{MCG}$ may be configured as one of the cells of the MeNodeB 505-a that belong to the MCG. The $PCell_{MCG}$ may be configured to provide lower layer functionalities (e.g., MAC/PHY layer) within the MCG.

In an example, the SeNodeB 505-b may provide configuration information of lower layer functionalities (e.g., MAC/PHY layers) for the SCG. The configuration information may be provided by the $PCell_{SCG}$ as one or more radio resource control (RRC) messages, for example. The $PCell_{SCG}$ may be configured to have the lowest cell index (e.g., identifier or ID) among the cells in the SCG. For example, some of the functionalities performed by the SeNodeB 505-b via the $PCell_{SCG}$ may include carrying the PUCCH, configuring the cells in the SCG to follow the DRX configuration of the $PCell_{SCG}$, configure resources for contention-based and contention-free random access on the SeNodeB 505-b, carrying downlink (DL) grants having transmit power control (TPC) commands for PUCCH, estimating path loss based on $PCell_{SCG}$ for other cells in the SCG, providing common search space for the SCG, and providing SPS configuration information for the UE 515.

In some aspects, the $PCell_{MCG}$ may be configured to provide upper level functionalities to the UE 515 such as security, connection to a network, initial connection, and/or radio link failure, for example. The $PCell_{MCG}$ may be configured to carry physical uplink control channel (PUCCH) for cells in the MCG, to include the lowest cell index among the MCG, to enable the MCG cells to have the same discontinuous reception (DRX) configuration, to configure random access resources for one or both of contention-based and contention-free random access on the MeNodeB 505-a, to enable downlink grants to convey transmit power control (TPC) commands for PUCCH, to enable path loss estimation for cells in the MCG, to configure common search space for the MeNodeB 505-a, and/or to configure semi-persistent scheduling.

In some aspects, the $PCell_{SCG}$ may be configured to carry PUCCH for cells in the SCG, to include the lowest cell index among the SCG, to enable the SCG cells to have the same DRX configuration, to configure random access resources for one or both of contention-based and contention-free random access on the SeNodeB 505-b, to enable downlink grants to convey TPC commands for PUCCH, to enable path loss estimation for cells in the SCG, to configure common search space for the SeNodeB 505-b, and/or to configure semi-persistent scheduling.

Returning to the example of FIG. 5, the UE 515 may support parallel PUCCH and physical uplink shared channel (PUSCH) configurations for the MeNodeB 505-a and the SeNodeB 505-b. In some cases, the UE 515 may use a configuration (e.g., UE 515 based) that may be applicable to both carrier groups. These PUCCH/PUSCH configurations may be provided through RRC messages, for example.

The UE 515 may also support parallel configuration for simultaneous transmission of acknowledgement (ACK)/negative acknowledgement (NACK) and channel quality indicator (CQI) and for ACK/NACK/sounding reference signal (SRS) for the MeNodeB 505-a and the SeNodeB 505-b. In some cases, the UE 515 may use a configuration (e.g., UE based and/or MCG or SCG based) that may be applicable to both carrier groups. These configurations may be provided through RRC messages, for example.

Figure 6:
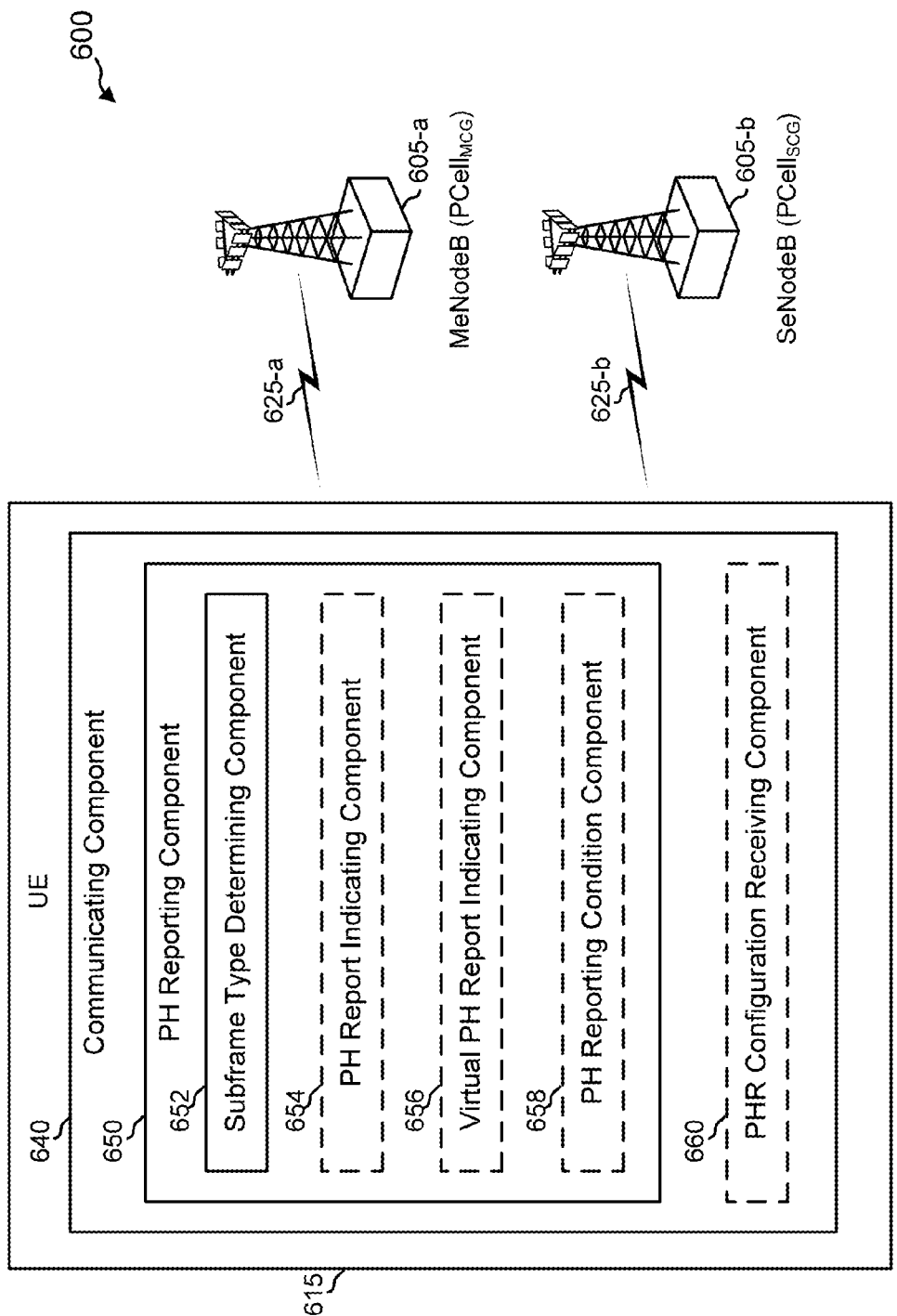
FIG. 6 is a block diagram conceptually illustrating an example of a UE and components configured in accordance with an aspect of the present disclosure.
Figure 7:
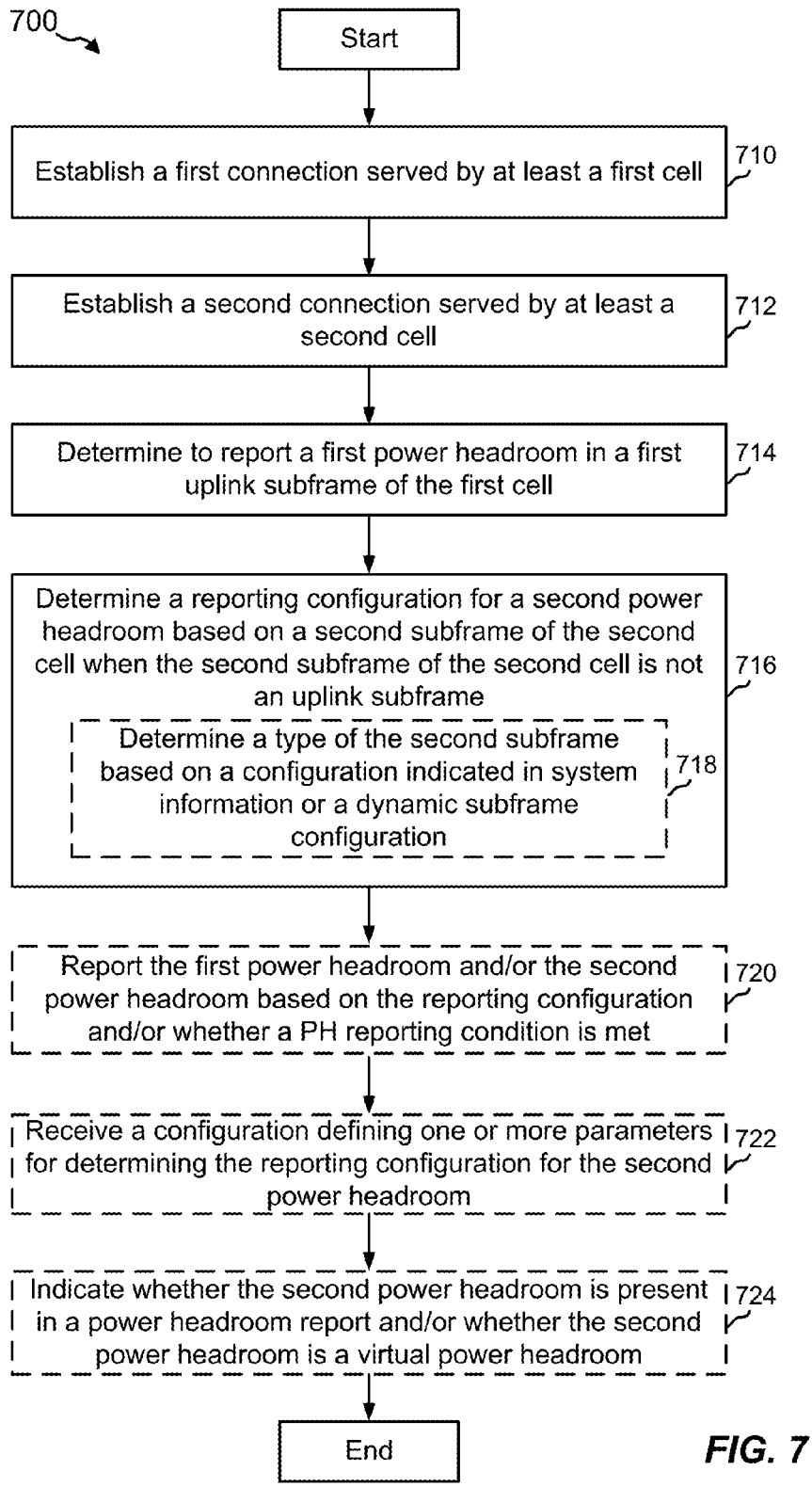
FIG. 7 is a flowchart illustrating a method for reporting power headroom in accordance with an aspect of the present disclosure.
Figure 8:
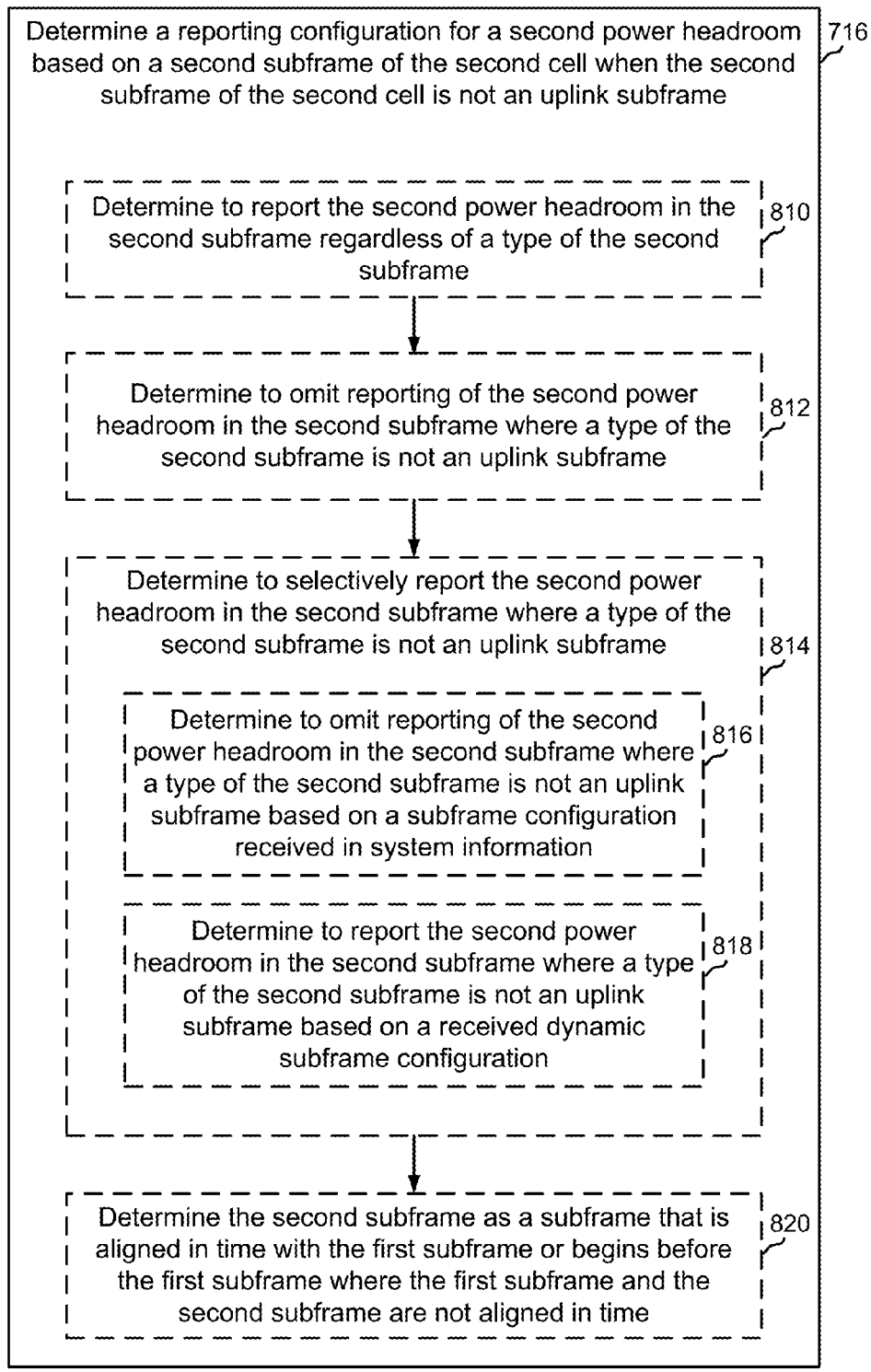
FIG. 8 is a flowchart illustrating a method for reporting power headroom in accordance with an aspect of the present disclosure.
Figure 10:
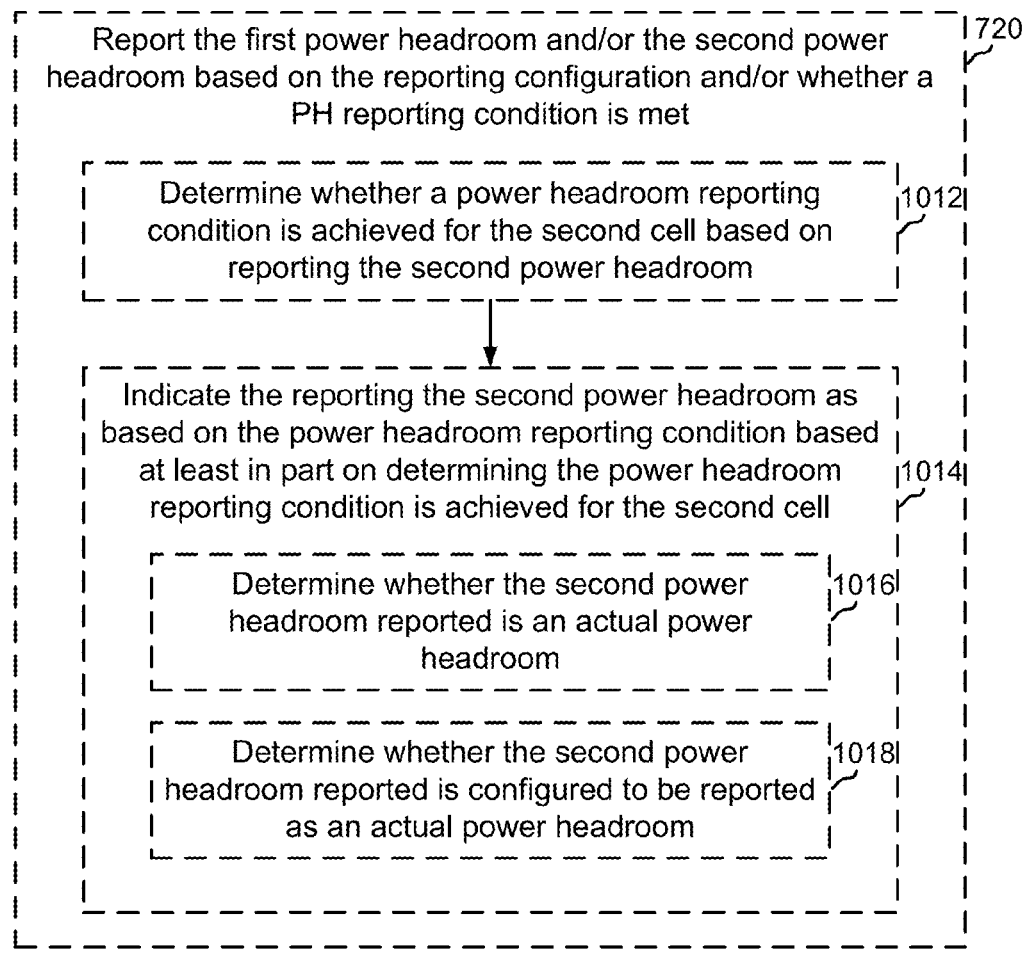
FIG. 10 is a flowchart illustrating a method for reporting power headroom in accordance with an aspect of the present disclosure.

FIG. 6 is a block diagram 600 conceptually illustrating an example of a UE 615 and components configured in accordance with an aspect of the present disclosure. FIGS. 7, 8, and 10, which are described in conjunction with FIG. 6 herein, illustrate an example method 700 in accordance with aspects of the present disclosure. Although the operations described below in FIGS. 7, 8 and 10 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

Referring to FIG. 6, a base station/eNodeB 605-a (MeNodeB with a $PCell_{MCG}$), a base station/eNodeB 605-b (SeNodeB with a $PCell_{SCG}$), and the UE 615 of diagram 600 may be one of the base stations/eNodeBs (or APs) and UEs as described in various Figures. The MeNodeB 605-a, or a $PCell_{MCG}$ related thereto, and the UE 615 may communicate over communication link 625-a. The SeNodeB 605-b, or a $PCell_{SCG}$ related thereto, and the UE 615 may communicate over communication link 625-b. In one example, the MeNodeB 605-a may be configured as a $PCell_{MCG}$ and the SeNodeB 605-b as a $PCell_{SCG}$ in multiple connectivity, as described herein. In another example, MeNodeB 605-a and SeNodeB 605-b may be the same eNodeB that provides carrier aggregation in one or more cells over communication links 625-a and 625-b. In either case, UE 615 may be configured to transmit a plurality of PHRs via communication links 625-a and 625-b such that reports for both links are transmitted together. Each of the communication links 625-a, 625-b may be an example of the communication links 125 of FIG. 1. Communication links 625-a and 625-b may be configured to have different frame structures, different subframe configurations, different timing or timing offsets, and/or the like. In this regard, when the UE 615 is configured to transmit a PHR for communication link 625-a in an uplink subframe, the corresponding subframe over communication link 625-b during the same period of time may not be an uplink subframe (e.g., may be a downlink or special subframe). UE 615 may determine a reporting configuration to handle such scenarios, as described further herein.

Examples of LTE concepts that may result in aggregated carriers having different frame structures, subframe configurations, timings, etc. are described below. It is to be appreciated, however, that the concepts described herein for reporting PHR for carriers having different frame structures, subframe configurations, timings, etc. are not to be limited to LTE or the example LTE-related concepts described below. For example, where the eNodeBs 605-*a* and/or 605-*b* are LTE eNodeBs, the eNodeBs 605-*a* and 605-*b* may utilize a FDD frame structure, where separate frequency resources are provided for uplink and downlink communications, or a TDD frame structure, where each subframe is configured for either uplink or downlink communications but may use the same frequency resources. For example, in LTE-TDD, seven downlink and uplink subframe configurations may be supported as shown below.

| Uplink-downlink config-uration | Downlink-to-Uplink Switch-point periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the table above, there are two switching periodicities, 5 ms and 10 ms. The 5 ms switching periodicity subframe configurations (0, 1, 2, and 6) each have two special "S" subframes that occur between switching from a downlink "D" subframe to an uplink "U" subframe. The 10 ms switching periodicity subframe configurations (3, 4, and 5) each have one special "S" subframe. The special subframes are defined to allow for time to switch communication resources from downlink to uplink. For example, the special subframes may include a downlink pilot time slot, followed by a guard period during which communications are not scheduled for transmission, followed by an uplink pilot time slot.

In addition, in some versions of LTE, a UE can be configured with multiple aggregated component carriers (CC) where the CCs can be configured as FDD or TDD, where the CCs can be with the same or different cell, the same or different eNodeB, etc, as described. In another example, where the CCs are configured as TDD, each CC can utilize a different TDD subframe configuration, as shown in the table above. One CC is designated as the primary CC (PCC), which can be semi-statically configured by higher layers on a per UE basis, and the other CC(s) are secondary CCs (SCC). In this configuration, control data such as ACK/NACK, CQI, and scheduling request (SR), when transmitted on PUCCH, can be transmitted on the PCC. Up to 5:1 downlink to uplink CC mapping can be possible, and one uplink CC can support ACK/NACK transmission on PUCCH for up to five downlink CCs.

In another example, in a version of LTE, joint operation of FDD and TDD, including CA, multiple connectivity, etc., can be supported subject to one or more configurations. For example, UEs supporting FDD and TDD CA may be able to access both legacy FDD and legacy TDD single mode carriers, legacy FDD UEs and UEs supporting FDD and TDD CA may camp on and connect the FDD carrier, which is part of the jointly operator FDD and TDD network, legacy TDD UEs and UEs supporting FDD and TDD CA may camp on and connect the TDD carrier, which is part of the jointly operator FDD and TDD network, and/or a new TDD uplink/downlink configuration may not be introduced.

Moreover, in a version of LTE, evolved interference management for traffic adaptation (eIMTA) is defined for possibly dynamically adapting TDD subframe configurations based on actual traffic needs. For example, if during a short duration, an eNodeB needs a large data burst on the downlink, the subframe configuration utilized by the eNodeB can be changes from e.g., configuration 1 in the table above (6 downlink subframes to 4 uplink subframes) to configuration 5 (9 downlink subframes to 1 uplink subframe). The adaptation of TDD subframe configuration in this regard is expected to be on the order of 10 ms to 640 ms. In addition, the adaptation may cause interference to downlink and uplink when two or more nearby cells have different downlink and uplink subframes. Moreover, the adaptation may cause some complexity in downlink and uplink HARQ timing management. For example, each of the seven TDD subframe configurations may have their own HARQ timing, which may be optimized for each configuration (in terms of HARQ operation efficiency). For example, the timing from PDSCH to the corresponding ACK/NACK can be different for different TDD subframe configurations. Additionally, dynamic switching among the seven configurations (or more if available) may imply that if current downlink/uplink HARQ timing is kept, there may be missed ACK/NACK transmission opportunities for some of the downlink or uplink transmissions.

Dynamic indication of the TDD subframe configuration is possible using various mechanisms, such as explicit layer 1 (PHY) signaling of reconfiguration by a UE-group common PDCCH or enhanced PDCCH, introduction of a new radio network temporary identifier (RNTI) for explicit reconfiguration DCI (e.g., an eIMTA-RNTI), a number of bits (e.g., 3) dedicated in the reconfiguration DCI to explicitly indicate one of the existing seven TDD subframe configurations, transmission of the reconfiguration DCI in at least PDCCH common search space (CSS) of the PCell. For a UE configured (e.g., by an eNodeB) with TDD eIMTA, for HARQ operation, uplink scheduling timing and HARQ timing can follow the TDD subframe configuration signaled in system information block (SIB) 1, and/or downlink HARQ reference configuration can be selected from TDD subframe configurations 2, 4, or 5.

In another example, as described above, a plurality of eNodeBs can provide multiple connectivity wireless communications. In this configuration, for example, a common search space and PUCCH can be supported on a secondary cell in the SCG such that PUCCH can be transmitted on each or either of the a PCell of a MCG and an SCell of the SCG. Additionally, in this configuration, uplink power can be shared between the multiple cell groups (e.g., each group can be guaranteed a certain minimum power and/or the power can be shared in a dynamic manner). Accordingly, a PHR can be transmitted on PUCCH for each of multiple cell groups. Because the power may be shared, it can be beneficial to determine transmit power and transmit PHR for each of the multiple cell groups at similar times. In addition, for example, the multiple eNodeBs may require transmission of PHR at similar times. It is possible, as described above, that CCs with the eNodeB(s) and/or related cell(s) have different frame structures, subframe configurations, timings, etc., which may result in a subframe during which PHR is transmitted for one cell group being a downlink subframe for another cell group.

In addition, in LTE, there are at least two types of PHR. A first type of PHR includes the UE transmitting PUSCH without PUCCH on a cell, and if there is no actual PUSCH transmission from which to reference the PHR, a virtual PHR is used for PUSCH. A second type of PHR includes the UE transmitting PUSCH and PUCCH on a cell, and if there is no actual PUCCH and/or PUSCH transmission from which to reference the PHR, a virtual PHR is used for PUCCH and/or PUSCH. Virtual PHR can be specified assuming a reference PUSCH or PUCCH format and no maximum power reduction (MPR). For multiple connectivity in LTE, a UE can be configured to always report virtual power headroom for activated cells belonging to another cell group/eNodeB, or to report actual power headroom when there is a PUCCH/PUSCH transmission for a cell in the other cell group/eNodeB (or otherwise virtual power headroom).

As described, in multiple connectivity scenarios, PHR can reported for at least one cell in one cell group and at least another cell in another cell group. The cell groups may have different frame structures (e.g., TDD vs. FDD), difference subframe configurations (e.g., semi-static or dynamic as in eIMTA), etc. Thus, when PHR is reported for one cell, it may be during a downlink subframe with the other cell in the other cell group. Moreover, there may be misalignment between eNodeBs and UE regarding whether a virtual or actual PHR is reported (e.g., due to the UE missing PDCCH detection and/or due to absence of in-time information whether or not a cell of a different group is using virtual PHR or actual PHR, which may depend on whether there are actual uplink transmissions to serve as a reference for the PHR, etc.).

In this regard, UE 615 may include a communicating component 640 to manage power headroom reporting (e.g., based on a configuration information received from one or more of the eNodeBs 605-a or 605-b, received in provisioning when joining a network, received from a configuration stored on UE 615, etc.). For example, communicating component 640 may manage the power headroom reporting for communication links 625-a and 625-b based at least in part on a subframe type determined for one or more of the communication links 625-a or 625-b when reporting power headroom for another communication link 625-a or 625-b. Moreover, communicating component 640, in this regard, can manage power headroom reporting to include an actual or virtual power headroom report based at least in part on the subframe type as well. In addition, though described below as determining reporting configuration for reporting power headroom of SeNodeB 605-b (or the related SCG) based on determining to report power headroom for MeNodeB 605-a (or the related MCG), it is to be appreciated that similar concepts can be applied for determining reporting configuration for reporting power headroom of MeNodeB 605-a (or the related MCG) based on determining to report power headroom for SeNodeB 605-b (or the related SCG) or more for communication links 625-a and 625-b, which may be aggregated carriers with a single eNodeB and/or related cell.

Referring to FIG. 7, method 700 includes, at Block 710, establishing a first connection served by at least a first cell. UE 615 (FIG. 6) includes a communicating component 640 for establishing the first connection served by at least the first cell. As described, for example, the first connection can include communication link 625-a established with a MeNodeB 605-a or a related cell (e.g., a $PCell_{MCG}$) or cell group (e.g., a MCG), as described herein. Communicating component 640 can establish this first connection based at least in part on a configuration received from the first cell, which may be received in response to requesting network access via the first cell (e.g., performing a random access procedure with the first cell).

Method 700 also includes, at Block 712, establishing a second connection served by at least a second cell. Communicating component 640 of UE 615 can similarly establish the second connection served by at least the second cell, which can include communication link 625-b established with a SeNodeB 605-b or a related cell (e.g., $PCell_{SCG}$) or related cell group (e.g., a SCG). Communicating component 640 can establish this second connection based at least in part on a configuration received from the first cell and/or the second cell to facilitate multiple connectivity among the cells (which may be in different cell groups), as described herein. In this regard, communicating component 640 can communicate with the MeNodeB 605-a and SeNodeB 605-b over communication links 625-a and 625-b in multiple connectivity, though it is to be appreciated that multiple secondary links can be established with additional eNodeBs, cells, or cell groups in multiple connectivity. Moreover, though multiple connectivity is depicted, it is to be appreciated that communicating component 640 may establish communication link 625-b as the second connection with the first cell or another cell of MeNodeB 605-a (or another eNodeB) in carrier aggregation. In either case, power headroom reporting can be configured for both communication links 625-a and 625-b and/or other communication links.

Method 700 also includes, at Block 714, determining to report a first power headroom in a first uplink subframe of the first cell. Communicating component 640 includes a power headroom (PH) reporting component 650 for determining to report the first PH in the first uplink subframe of the first cell. For example, communicating component 640 may receive (e.g., from the MeNodeB 605-a in establishing communications therewith) or otherwise determine (e.g., from instructions or parameters stored in a memory) a configuration related to reporting the PH for the first cell (e.g., for communication link 625-a as related to the $PCell_{MCG}$). For example, the configuration for reporting the PH can be according to a certain time interval, in certain subframes, based on occurrence of one or more events (e.g., path loss experienced to the MeNodeB 605-a exceeding a threshold, a periodic configuration for reporting PH, etc.), and/or the like. Communicating component 640 can also determine whether to report a second PH for the communication link 625-b (e.g., as related to the SCG) as a corresponding report to the first PH for the MCG. Where a subframe over communication link 625-b that that is synchronous with the subframe over communication link 625-a for transmitting the reports is an uplink subframe, PH reporting component 650 can transmit the corresponding PHR for communication link 625-b as well. As described, however, communication links 625-a and 625-b may use different frame structures (e.g., FDD, TDD, etc.), different subframe configurations (e.g., TDD subframe configurations), different timing or timing offsets, etc., and thus a subframe over which the PHR for communication link 625-a is transmitted may occur over a non-uplink subframe (e.g., downlink or special subframe) of communication link 625-b.

Thus, method 700 further includes, at Block 716, determining a reporting configuration for a second power headroom based on a second subframe of the second cell when the second subframe of the second cell is not an uplink subframe. PH reporting component 650 can determine the reporting configuration for the second power headroom based on the second subframe of the second cell (e.g., for communication link 625-b) when the second subframe of the second cell is not an uplink subframe. In an example, determining the reporting configuration at Block 716 may optionally include, at Block 718, determining a type of the second subframe based on a configuration indicated in system information or a dynamic subframe configuration. PH reporting component 650 includes a subframe type determining component 652 for determining the type of the second subframe based on the configuration indicated in system information (e.g., SIB1) or a dynamic subframe configuration (e.g., eIMTA or other dynamic or semi-static subframe configuration). In one example, subframe type determining component 652 can determine the type of the second subframe based at least in part on PH reporting component 650 determining to transmit the PHR for communication link 625-a in the first subframe. For example, subframe type determining component 652 may determine the type of the second subframe based at least in part on a subframe configuration for the second cell received in system information (e.g., SIB1) from SeNodeB 605-b (or related $PCell_{SCG}$ or SCG) for the communication link 625-b. As described, the second cell (e.g., SeNodeB 605-b or a related $PCell_{SCG}$ or other cell in the SCG) can transmit system information that indicates a TDD subframe configuration to use in communicating with the second cell over communication link 625-b. Thus, subframe type determining component 652 can determine a subframe type for the given subframe based on the indicated TDD subframe configuration, in one example. In another example, MeNodeB 605-a (or a related $PCell_{MCG}$ or other cell in the MCG) may indicate the subframe configuration for the communication link 625-b in configuring the UE 615 for multiple connectivity or otherwise in system information broadcasted to one or more UEs. In yet another example, as described, subframe type determining component 652 may determine a subframe type based at least in part on a dynamic or semi-static subframe configuration received for the communication link 625-b (e.g., from SeNodeB 605-b or related $PCell_{SCG}$ or other cell in the SCG) as received in an eIMTA configuration or other dynamic/semi-static subframe configuration assignment. In this example, eIMTA may be implemented over communication link 625-b with one or more UEs to configure additional downlink resources for traffic adaptation, and SeNodeB 605-b may notify the UE 615 of a new TDD subframe configuration to be utilized in one or more frames (e.g., based on explicit layer 1 signaling, a new RNTI for reconfiguration in a DCI, etc., as described above). Thus, in this example, subframe type determining component 652 can determine the subframe type based on the received TDD subframe configuration.

In one example, the reporting configuration determined by PH reporting component 650 (e.g., at Block 716) can be based on subframe type determining component 652 determining the subframe type of the second subframe of the second cell. Where the type is an uplink subframe, as described, PH reporting component 650 can report the second power headroom for the communication link 625-b along with the first power headroom for communication link 625-a. Examples for determining the reporting configuration where the second subframe is not an uplink subframe are further illustrated in FIG. 8.

For example, as shown in FIG. 8, determining the reporting configuration at Block 716 may optionally include, at Block 810, determining to report the second power headroom in the second subframe regardless of a type of the second subframe. PH reporting component 650 can determine to report the second power headroom for communication link 625-b in the second subframe regardless of the type of the second subframe. Thus, even where the type of the second subframe is not an uplink subframe (e.g., downlink or special subframe), PH reporting component 650 may report the second PH in the second subframe (e.g., along with the first PH in the first subframe where the first and second subframes are substantially aligned in time). In this example, at least where the second subframe is a downlink or special subframe, PH reporting component 650 can determine to report the power headroom using a virtual PHR. Reporting power headroom regardless of the type of the second subframe may allow for consistent alignment of the PHRs between the UE 615, MeNodeB 605-a and SeNodeB 605-b (e.g., over corresponding communication links 625-a and 625-b).

In another example, determining the reporting configuration at Block 716 may optionally include, at Block 812, determining to omit reporting of the second power headroom in the second subframe where a type of the second subframe is not an uplink subframe. PH reporting component 650 can determine to omit reporting of the second power headroom in the second subframe where a type of the second subframe is not an uplink subframe. This can save from uplink overhead caused by reporting the power headroom in a subframe configured for downlink communications. In this example, PH reporting component 650 reports the first power headroom in the first uplink subframe without reporting the second power headroom.

In yet another example, determining the reporting configuration at Block 716 may optionally include, at Block 814, determining to selectively report the second power headroom in the second subframe where a type of the second subframe is not an uplink subframe. PH reporting component 650 can determine to selectively report the second power headroom for communication link 625-b in the second subframe where a type of the second subframe is not an uplink subframe. For example, this can be based at least in part on whether the subframe is dynamically configured as a non-uplink subframe over the communication link 625-b. In addition, determining to selectively report the second power headroom may also include determining whether to report the second PH as a virtual or actual PH based on the type of the second subframe, as described further herein.

Determining to selectively report the second power headroom at Block 814 may optionally include, at Block 816, determining to omit reporting of the second power headroom in the second subframe where a type of the second subframe is not an uplink subframe based on a subframe configuration received in system information. PH reporting component 650 can determine to omit reporting of the second power headroom in the second subframe where the type of the second subframe over the communication link 625-b is not an uplink subframe based on a subframe configuration received in system information. As described, communicating component 640 can receive a subframe configuration for the communication link 625-b in system information (e.g., SIB1) broadcasted from the related cell or cell group (e.g., by SeNodeB 605-b). In this example, where the type of the second subframe based on the subframe configuration broadcasted in the system information is not an uplink subframe (e.g., a downlink or special subframe), PH reporting component 650 can omit reporting of the second power headroom in the second subframe regardless of whether the subframe is dynamically or semi-statically configured as an uplink subframe (e.g. in eIMTA). For example, dynamic or semi-static subframe configuration information may not be available to the MeNodeB 605-a, and thus the MeNodeB 605-a may not expect to receive the PHR for communication link 625-b along with the PHR for communication link 625-*a* based on the indicated subframe configuration for communication link 625-*b*.

Additionally or alternatively, determining to selectively report the second power headroom at Block 814 may optionally include, at Block 818, determining to report the second power headroom in the second subframe where a type of the second subframe is not an uplink subframe based on a received dynamic subframe configuration. PH reporting component 650 can determine to report the second power headroom in the second subframe where the type of the second subframe is not an uplink subframe based on a received dynamic subframe configuration. As described, communicating component 640 may also receive a dynamic or semi-static subframe configuration, which may be different than the subframe configuration broadcasted in the system information. In an example, communicating component 640 may receive the dynamic or semi-static subframe configuration in a DCI for the communication link 625-*b* (e.g., from the SeNodeB 605-*b* when the SeNodeB 605-*b* implements eIMTA for additional downlink resources). It is to be appreciated, however, that the dynamic or semi-static subframe configuration may not be available to MeNodeB 605-*a* or the related MCG. In this example, PH reporting component 650 may determine to report the second power headroom in the second subframe where the second subframe is not an uplink subframe based on the dynamic or semi-static configuration, though the subframe was configured as an uplink subframe in the subframe configuration received in system information). Further examples are described with reference to FIG. 9 below.

In another example, determining the reporting configuration at Block 716 may optionally include, at Block 820, determining the second subframe as a subframe that is aligned in time with the first subframe or begins before the first subframe where the first subframe and the second subframe are not aligned in time. PH reporting component 650 can determine the second subframe as a subframe that is aligned in time with the first subframe or begins before the first subframe where the first subframe and the second subframe are not time aligned. Thus, determining the reporting configuration at Block 716 may be further based on whether the second subframe is time aligned with the first subframe. Where the first and second subframes are not time aligned, the second subframe used in determining the reporting configuration in Block 716 may correspond to a subframe occurring before the first subframe in time (e.g., that additionally overlaps with the first subframe). In one example, where the subframe occurring before the first subframe in time but overlapping the first subframe is not an uplink subframe, PH reporting component 650 may determine to omit reporting of the second power headroom for communication link 625-*b* due to timing uncertainty and the lack of a reference subframe for the PHR. In another example, where the subframe occurring before the first subframe in time but overlapping the first subframe is an uplink subframe, PH reporting component 650 may determine to report the second power headroom for communication link 625-*b* along with the first power headroom for communication link 625-*a*. Further examples are described with reference to FIG. 9 below.

Figure 9:
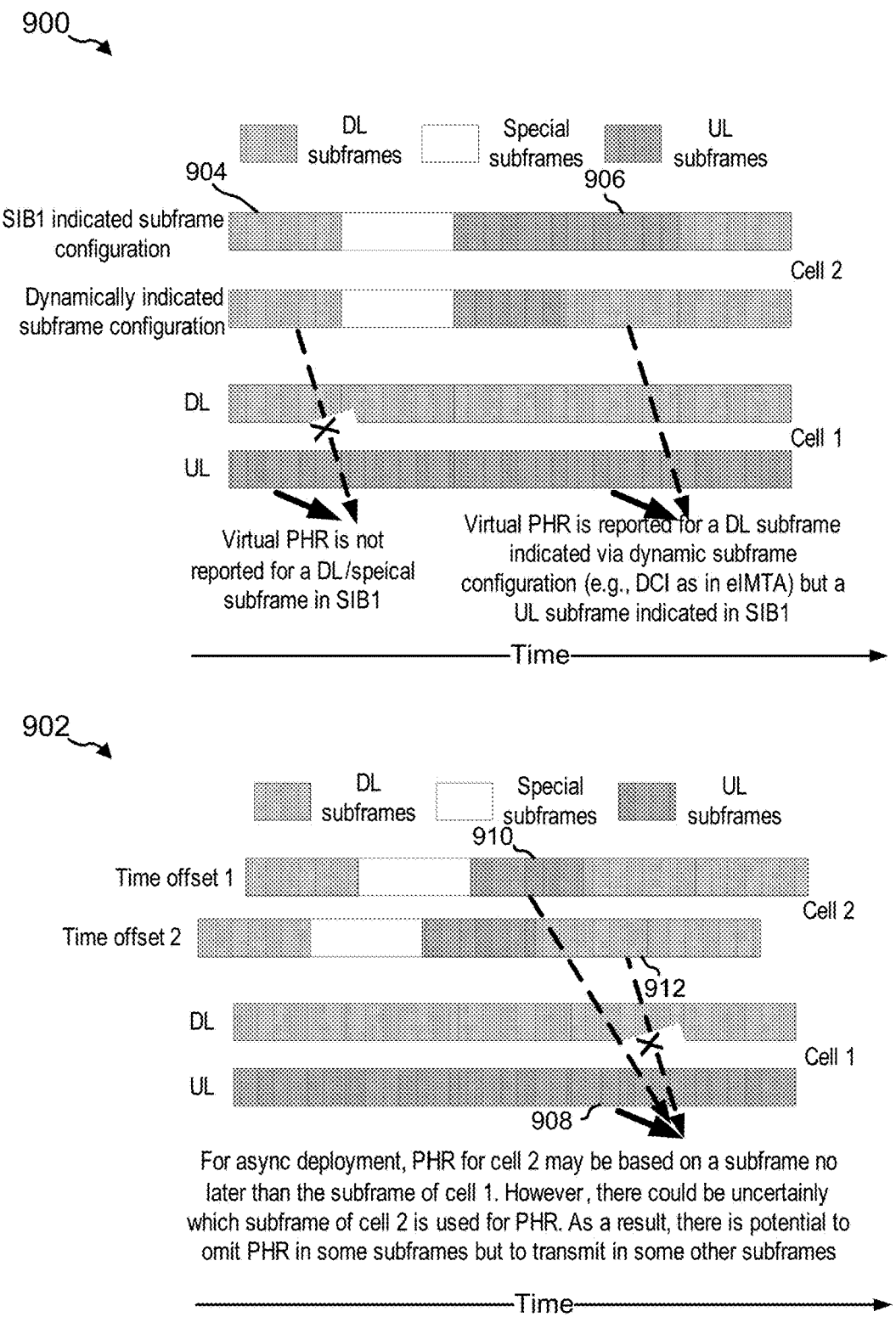
FIG. 9 illustrates example timelines for reporting power headroom in accordance with an aspect of the present disclosure.

FIG. 9 depicts two example communication timelines 900, 902 showing examples of reporting configurations for PHR for the communication link 625-*b* (e.g., as related to a CC in carrier aggregation, as related to an SCG in multiple connectivity, etc.), in accordance with an aspect of the present disclosure. In the timelines 900, 902, cell 1 (e.g., a cell provided by MeNodeB 605-*a* in a MCG) uses FDD for communicating with the UE using different frequency resources for downlink (DL) and uplink (UL) communications over a communication link (e.g., communication link 625-*a*), and cell 2 (e.g., a cell provided by SeNodeB 605-*b* in a SCG or a different or same cell as cell 1 providing a different CC in carrier aggregation) uses TDD where each subframe over a frequency resource is configured either for uplink, downlink, or special communications over a communication link (e.g., communication link 625-*b*), as described herein. Accordingly, in an example, the reporting configuration can be determined, at Block 716, to allow reporting of a corresponding PHR for the cell 2 (e.g., for communication link 625-*b*) along with the PHR for the cell 1 (e.g., for communication link 625-*a*), though the subframe for reporting is a non-uplink subframe for communication link 625-*b* where the non-uplink subframe is indicated as an uplink subframe in a SIB related to cell 2, but may be indicated as a non-uplink subframe in a dynamic subframe configuration (e.g., as part of a eIMTA). In another example, the reporting configuration can be determined, at Block 716, to omit reporting of a corresponding PHR for the cell 2 with the PHR of the cell 1, though the subframe for reporting is a non-uplink subframe for communication link 625-*b* where the subframe is indicated as a non-uplink subframe (e.g., a downlink or special subframe) in a SIB or a DL-HARQ reference configuration from the cell 2. Timeline 900 includes a timeline with cell 2 (as indicated in SIB and in a dynamic subframe configuration), which can correspond to a timeline of communication link 625-*b* between UE 615 and SeNodeB 605-*b* in FIG. 6, and a corresponding timeline with cell 1, which can correspond to a timeline of communication link 625-*a* between UE 615 and MeNodeB 605-*a*.

Thus, as shown in timeline 900, which relates to a synchronous network where cells 1 and 2 use the substantially same timing, subframe 904 is indicated as a downlink subframe in SIB1 indicated subframe configuration broadcast by cell 2. In this example, the reporting configuration can specify to omit transmitting PHR for the cell 2 in this subframe 904 (or in any subframes configured as downlink or special subframes in SIB 1) when transmitting PHR scheduled for transmission in this subframe for cell 1. Subframe 906, however, is indicated in SIB as an uplink subframe in the SIB1 indicated subframe configuration, but is reconfigured as a downlink subframe in a dynamically indicated subframe configuration (e.g., in eIMTA). In this example, the reporting configuration can specify to transmit a virtual PHR for cell 2 when transmitting PHR of cell 1 in subframe 906 based on the SIB1 indicated subframe configuration (and irrespective of the dynamic or semi-static subframe configuration). This configuration may result from the MeNodeB 605-*a* (which may configure the UE 615 with the reporting configuration) not knowing the dynamic configuration between UE 615 and SeNodeB 605-*b*.

In another example, the reporting configuration can be determined to provide reporting of PH for cell 2 along with the PHR of cell 1 based on a subframe type of a second subframe of the communication link 625-*b* that begins at the same time as or before a first subframe of the communication link 625-*a*. This is different from an alternative design where the PHR of the cell 2 is based on a subframe type of a second subframe of the communication link 625-*b* that begins at the same time as or later than a first subframe of the communication link 625-*a*, since this alternative may potentially require computing PHR based on a future subframe. This configuration may be used when the gating intervals (e.g., frames) of the communication links 625-*a* and 625-*b* are asynchronous and use different timing or timing offsets. In this example, though a type of a subframe of the communication link 625-*b* that initiates during the first subframe may or may not be an uplink subframe, the preceding subframe may be used in determining whether to send a corresponding PHR for the cell 2, as the preceding subframe may overlap with the time for transmitting the PHR for the cell 1 (e.g., at the beginning of the subframe). Thus, if the preceding subframe of communication link 625-*b* (the second subframe) is an uplink subframe, a PHR can be sent as a corresponding PHR for the cell 2 (e.g., as an actual or virtual PHR depending on whether uplink data is present for transmission). If the preceding subframe is not an uplink subframe, the reporting configuration can be determined, at Block 716, to omit transmitting the PHR for the cell 2, or transmit the PHR for the cell 2 as a virtual PHR since there would be no corresponding reference uplink transmission for the PHR, etc. An example is shown in timeline 902, as described below.

Timeline 902 of FIG. 9 can include a timeline for cell 1, which can correspond to communication link 625-*a* between UE 615 and MeNodeB 605-*a* in FIG. 6, as described, and two alternative timelines for cell 2—each illustrating a different possible timing offset (time offset 1 and time offset 2)—that can correspond to communication link 625-*b* between UE 615 and SeNodeB 605-*b*. The timelines between cells 1 and 2 are asynchronous as they do not substantially align in time. In this example, a PHR for cell 1 can be transmitted in subframe 908. In the asynchronous system, the reporting configuration can be determined to report or omit a PHR for cell 2 when reporting PHR for cell 1 based on a type of a subframe with cell 2 that begins before subframe 908 of cell 1 and at least partially overlaps subframe 908 of cell 1 in time, as described above. In time offset 1 for cell 2, the subframe 910, overlapping subframe 908 initiated for transmitting the PHR for cell 1, is an uplink subframe. Thus, UE 615 can transmit a PHR for the cell 2 to SeNodeB 605-*b* according to the reporting configuration during subframe 910 when transmitting the PHR for cell 1. In an example, the PHR for the cell 2 may be an actual PHR where uplink transmission occurs in subframe 910. In time offset 2 for cell 2, the subframe 912, overlapping subframe 908 initiated for transmitting the PHR for the cell 1, is not an uplink subframe. Thus, UE 615 can refrain from transmitting a PHR for the cell 2 to SeNodeB 605-*b* according to the reporting configuration during subframe 912 when transmitting the PHR for cell 1. In another example, for subframe 912 not being an uplink subframe, the reporting configuration may be determined to report a virtual PHR during subframe 912 (e.g., where an actual PHR may be transmitted in the case of subframe 910 if an uplink transmission is also sent, which can provide a reference for the PHR).

Referring back to FIG. 7, method 700 can optionally include, at Block 720, reporting the first power headroom and/or the second power headroom based on the reporting configuration and/or whether a PH reporting condition is met. PH reporting component 650 can report the first power headroom and/or the second power headroom based on the reporting configuration and/or whether a PH reporting condition is met. This can include reporting the second power headroom for communication link 625-*b* where it is determined to report, refraining from reporting the power headroom where it is determined to omit, etc. In addition, for example, UE 615 can also optionally include a PH reporting condition component 658 for determining whether one or more PH reporting conditions are met when a PHR for the communication link 625-*b* is transmitted with a PHR for the communication link 625-*a*. For example, transmission of PHR can be based on one or more detected conditions, such as an increase in path loss to the cell group, a periodic configuration relating to a periodic time for scheduling transmission of PHRs (e.g., outside of detecting increase in path loss or other conditions), etc. Achieving PH reporting conditions can be tracked for the cells such to facilitate configuring the cells or UE 615 for communicating (e.g., configuring resource grants, determining to handover, configuring other communication parameters, etc.).

For example, as shown in FIG. 10, reporting the first and/or second power headroom at Block 720 may optionally include, at Block 1012, determining whether a power headroom reporting condition is achieved for the second cell based on reporting the second headroom. For example, when a PHR for the communication link 625-*b* is sent with a PHR for the communication link 625-*a*, PH reporting condition component 658 can determine whether a PH reporting condition is achieved for the second cell (e.g., for the communication link 625-*b*). This can include PH reporting condition component 658 determining whether a path loss of communication link 625-*b* has increased to achieve a threshold, whether a periodic timer related to reporting PH has expired for communication link 625-*b*, etc. Accordingly, reporting the first and/or second power headroom at 720 may also optionally include, at Block 1014, indicating the reporting the second power headroom as based on the power headroom reporting condition based at least in part on determining the power headroom reporting condition is achieved for the second cell. PH reporting condition component 658 can indicate the reporting the second power headroom as based on the power headroom reporting condition based at least in part on determining the power headroom reporting condition is achieved for the second cell.

In some examples, PH reporting condition component 658 may check for the reporting condition and/or indicate triggering of the PHR based on a type of the PHR. Thus, for example, indicating the reporting the second power headroom as based on the power headroom reporting condition at Block 1014 may optionally include, at Block 1016, determining whether the second power headroom reported is an actual power headroom. Thus, in an example, PH reporting condition component 658 may indicate the reporting as based on the power headroom reporting condition where the second power headroom report is an actual power headroom, but not where the second power headroom report is a virtual power headroom. In another example, indicating the reporting the second power headroom as based on the power headroom reporting condition at Block 1014 may optionally include, at Block 1018, determining whether the second power headroom is configured to be reported as an actual power headroom. PH reporting condition component 658 may determine whether the second power headroom is configured to be reported as an actual power headroom at least where an uplink data transmission is available for a reference point (e.g., as opposed to always a virtual power headroom). In such cases, PH reporting condition component 658 can indicate the reporting the second power headroom as based on the power headroom reporting condition. Reporting the second power headroom as based on the power headroom reporting condition may result in resetting or other modification of the reporting conditions, which may impact whether a subsequent power headroom for the second cell is reported in a subsequent operation at Block 720.

Method 700 can also optionally include, at Block 722, receiving a configuration defining one or more parameters for determining the reporting configuration for the second PHR. UE 615 can optionally include a PHR configuration receiving component 660 for receiving the configuration defining the one or more parameter for determining the reporting configuration for the second PHR. For instance, PHR configuration receiving component 660 can receive the configuration from MeNodeB 605-*a*, SeNodeB 605-*b*, other nodes in the MCG/SCG, received in network provisioning (e.g., when initially establishing a connection to a corresponding wireless network), obtained from a configuration stored in UE 615, and/or the like. Thus, the configuration may apply to all eNodeBs in a network or to a MeNodeBs, to combinations of eNodeBs, to SeNodeBs when communicating with a certain MeNodeB, vice versa, and/or the like. The one or more parameters of the configuration may define, for example, when PH reporting component 650 is to report or omit, or selectively report/omit, PHR for the communication link 625-*b*, as described above (e.g., based on determining one or more subframe types, based on determining that the cell groups are asynchronous, etc.).

In another example, method 700 may optionally include, at Block 724, indicating whether the second PHR is present as a corresponding report in a PHR and/or whether the second PHR is a virtual PHR. In this regard, for example, UE 615 may optionally include a PH report indicating component 654 for indicating whether a PHR includes a corresponding PHR for another cell. In this example, MeNodeB 605-*a* and/or SeNodeB 605-*b* can utilize the indication to determine whether an associated PHR is included with a PHR for the other cell group. For example, the indication can include a bit indicator set in the originally scheduled PHR (e.g. an indicator of whether a PHR for the communication link 625-*b* is included in the PHR for the communication link 625-*a*). Moreover, UE 615 may optionally include a virtual PH report indicating component 656 for indicating whether a PHR for the communication link 625-*b* that is transmitted with the PHR for the communication link 625-*b* is an actual or virtual PHR. In one example, a single bit indicator can be used (e.g., in the PHR), and can specify whether the PHR for the communication link 625-*b* is actual or virtual. It is to be appreciated that the PHR may not include a similar indicator for the communication link 625-*a*, as the UE 615 and MeNodeB 605-*a* likely know whether the PHR for the communication link 625-*a* is actual or virtual based on the existence or non-existence of uplink transmissions in the subframe. In this example, MeNodeB 605-*a* and/or SeNodeB 605-*b* can utilize the indication to determine whether the PHR for the communication link 625-*b* is an actual or virtual PHR.

Figure 11:
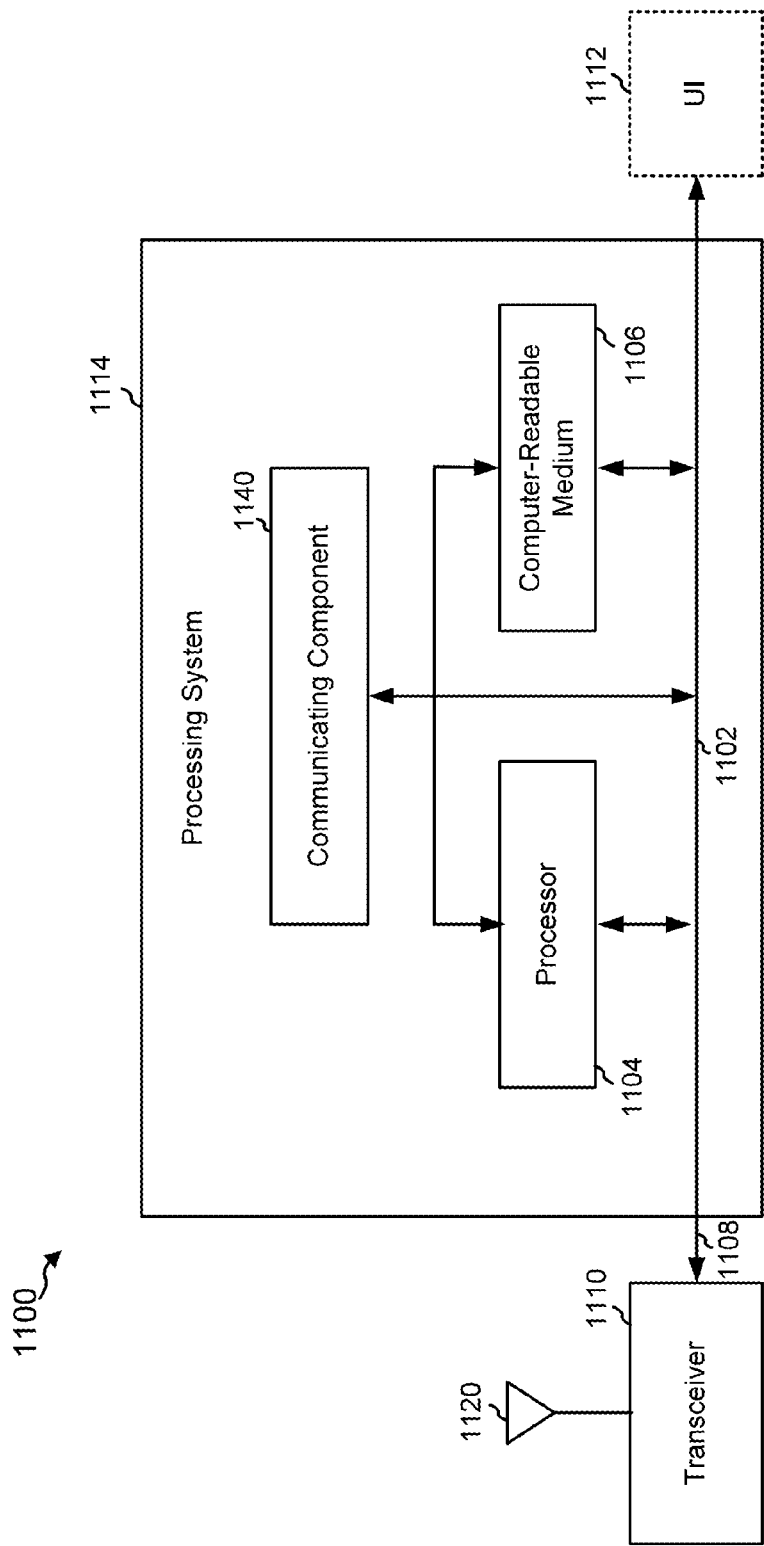
FIG. 11 is a block diagram conceptually illustrating an example hardware implementation for an apparatus employing a processing system configured in accordance with an aspect of the present disclosure.

FIG. 11 is a block diagram conceptually illustrating an example hardware implementation for an apparatus 1100 employing a processing system 1114 configured in accordance with an aspect of the present disclosure. The processing system 1114 includes a communicating component 1140. In one example, the apparatus 1100 may be the same or similar, or may be included with one of the UEs described in various Figures. In such example, the communicating component 1140 may correspond to, for example, the communicating component 640, and may thus be configured to perform functions described of the various components thereof, functions described in method 700 in FIGS. 7, 8, and 10, etc. In this example, the processing system 1114 may be implemented with a bus architecture, represented by the bus 1102. The bus 1102 may include any number of interconnecting buses and bridges depending on the application of the processing system 1114 and the overall design constraints. The bus 1102 links together various circuits including one or more processors (e.g., central processing units (CPUs), microcontrollers, application specific integrated circuits (ASICs), field programmable gate arrays (FPGAs)) represented by the processor 1104, and computer-readable media, represented by the computer-readable medium 1106. The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110, which is connected to one or more antennas 1120 for receiving or transmitting signals. The transceiver 1110 and the one or more antennas 1120 provide a mechanism for communicating with various other apparatus over a transmission medium (e.g., over-the-air). Depending upon the nature of the apparatus, a user interface (UI) 1112 (e.g., keypad, display, speaker, microphone, joystick) may also be provided.

The processor 1104 is responsible for managing the bus 1102 and general processing, including the execution of software stored on the computer-readable medium 1106. The software, when executed by the processor 1104, causes the processing system 1114 to perform the various functions described herein for any particular apparatus. The computer-readable medium 1106 may also be used for storing data that is manipulated by the processor 1104 when executing software. The communicating component 1140 as described above may be implemented in whole or in part by processor 1104, or by computer-readable medium 1106, or by any combination of processor 1104 and computer-readable medium 1106.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but it is to be accorded the widest scope consistent with the principles and novel features disclosed herein.

What is claimed is:

1. A method for reporting power headroom in a wireless network, comprising:
    establishing a first connection served by at least a first cell;
    establishing a second connection served by at least a second cell;
    determining to report, in the first cell, a first power headroom in a first uplink subframe of the first cell;
    determining that a type of a second subframe of the second cell, which at least partially overlaps the first uplink subframe in time, is not an uplink subframe; and
    determining a reporting configuration for reporting a second power headroom in the second cell, wherein the determining the reporting configuration is based at least in part on the determining that the type of the second subframe is not an uplink subframe.

2. The method of claim 1, wherein the first connection and the second connection are synchronous, and the second subframe occurs at a same time as the first uplink subframe for determining to report the first power headroom.

3. The method of claim 1, wherein determining that the type of the second subframe is not an uplink subframe comprises determining the type is one of a downlink subframe or a special subframe.

4. The method of claim 1, wherein determining that the type of the second subframe is not an uplink subframe is based at least in part on a subframe configuration signaled by at least one of the first cell or the second cell.

5. The method of claim 1, wherein determining the reporting configuration for the second power headroom comprises determining to report the second power headroom as a virtual power headroom based at least in part on the type of the second subframe as not an uplink subframe.

6. The method of claim 1, wherein determining the reporting configuration for the second power headroom comprises determining to omit reporting of the second power headroom for the second cell.

7. The method of claim 1, wherein determining that the type of the second subframe is not an uplink subframe is based at least in part on a semi-static subframe configuration or a dynamic subframe configuration.

8. The method of claim 7, wherein determining the reporting configuration for the second power headroom comprises determining to report the second power headroom as a virtual power headroom when the second subframe is indicated as not an uplink subframe according to the semi-static subframe configuration or the dynamic subframe configuration.

9. The method of claim 1, wherein the second subframe of the second cell occurs before and partially overlaps, in time, the first uplink subframe, wherein the first cell and the second cell utilize asynchronous timing.

10. The method of claim 1, further comprising receiving a configuration from the first cell indicating one or more parameters for the reporting configuration for the second power headroom based on the first power headroom, wherein determining the reporting configuration is based at least in part on the configuration.

11. The method of claim 1, further comprising:
    reporting the first power headroom for the first cell; and
    indicating, in reporting the first power headroom, whether the second power headroom is included in the reporting the first power headroom.

12. The method of claim 1, further comprising:
    reporting the first power headroom for the first cell and the second power headroom for the second cell; and
    indicating whether at least the second power headroom is a virtual power headroom or an actual power headroom.

13. The method of claim 1, further comprising:
    reporting the first power headroom for the first cell and the second power headroom for the second cell;

determining whether a power headroom reporting condition is achieved for the second cell based on reporting the second power headroom; and indicating the reporting the second power headroom as based on the power headroom reporting condition based at least in part on determining the power headroom reporting condition is achieved for the second cell.

14. The method of claim 13, wherein indicating the reporting of the second power headroom as based on the power headroom reporting condition is further based at least in part on determining whether the second power headroom reported is an actual power headroom.

15. The method of claim 13, wherein the power headroom reporting condition for the second cell is at least based a path loss change, or a periodic configuration.

16. The method of claim 1, wherein the first connection and the second connection belong to two different cell groups, and one of the first connection and the second connection is of a primary cell group, wherein the two different cell groups have different frame structures, different subframe configurations, or different communication timings.

17. An apparatus for reporting power headroom in a wireless network, comprising:
a memory; and
at least one processor coupled to the memory, and configured for:
establishing a first connection served by at least a first cell;
establishing a second connection served by at least a second cell;
determining to report, in the first cell, a first power headroom in a first uplink subframe of the first cell;
determining that a type of a second subframe of the second cell, which at least partially overlaps the first uplink subframe in time, is not an uplink subframe; and
determining a reporting configuration for reporting a second power headroom in the second cell, wherein the determining the reporting configuration is based at least in part on the determining that the type of the second subframe is not an uplink subframe.

18. The apparatus of claim 17, wherein the first connection and the second connection are synchronous, and the second subframe occurs at a same time as the first uplink subframe for determining to report the first power headroom.

19. The apparatus of claim 17, wherein determining that the type of the second subframe is not an uplink subframe comprises determining the type is one of a downlink subframe or a special subframe.

20. The apparatus of claim 17, wherein determining that the type of the second subframe is not an uplink subframe is based at least in part on a subframe configuration signaled by at least one of the first cell or the second cell.

21. The apparatus of claim 17, wherein the at least one processor is further configured for determining the reporting configuration for the second power headroom as a virtual power headroom based at least in part on the type of the second subframe as not an uplink subframe.

22. The apparatus of claim 17, wherein the at least one processor is further configured for determining the reporting configuration for the second power headroom to omit reporting of the second power headroom for the second cell.

23. The apparatus of claim 17, wherein determining that the type of the second subframe is not an uplink subframe is based at least in part on a semi-static subframe configuration or a dynamic subframe configuration.

24. The apparatus of claim 23, wherein the at least one processor is further configured for determining the reporting configuration for the second power headroom as a virtual power headroom when the second subframe is indicated as not an uplink subframe according to the semi-static subframe configuration or the dynamic subframe configuration.

25. An apparatus for reporting power headroom in a wireless network, comprising:
means for establishing a first connection served by at least a first cell;
means for establishing a second connection served by at least a second cell;
means for determining to report, in the first cell, a first power headroom in a first uplink subframe of the first cell;
means for determining that a type of a second subframe of the second cell, which at least partially overlaps the first uplink subframe in time, is not an uplink subframe; and
means for determining a reporting configuration for reporting a second power headroom in the second cell, wherein the means for determining the reporting configuration determines the reporting configuration based at least in part on the means for determining that the type of the second subframe is not an uplink subframe determining that the type of the second subframe is not an uplink subframe.

26. The apparatus of claim 25, wherein the first connection and the second connection are synchronous, and the second subframe occurs at a same time as the first uplink subframe for determining to report the first power headroom.

27. A non-transitory computer-readable storage medium comprising computer-executable code that, when executed by a computer, cause the computer to:
establish a first connection served by at least a first cell;
establish a second connection served by at least a second cell;
determine to report, in the first cell, a first power headroom in a first uplink subframe of the first cell;
determine that a type of a second subframe of the second cell, which at least partially overlaps the first uplink subframe in time, is not an uplink subframe; and
determine a reporting configuration for a second power headroom in the second cell, wherein the determining the reporting configuration is based at least in part on determining that the type of the second subframe is not an uplink subframe.

28. The non-transitory computer-readable storage medium of claim 27, wherein the first connection and the second connection are synchronous, and the second subframe occurs at a same time as the first uplink subframe for determining to report the first power headroom.

* * * * *